(12) United States Patent
Ochi et al.

(10) Patent No.: US 11,224,993 B2
(45) Date of Patent: Jan. 18, 2022

(54) PRODUCTION METHOD AND COATING DEVICE FOR COATING-LIQUID-IMPREGNATED SHEET-LIKE REINFORCING-FIBER BUNDLE AND SHEET-LIKE INTEGRATED OBJECT

(71) Applicant: Toray Industries, Inc., Tokyo (JP)

(72) Inventors: Takashi Ochi, Ehime (JP); So Nishino, Otsu (JP); Tamotsu Suzuki, Otsu (JP); Junichi Aoki, Ehime (JP)

(73) Assignee: Toray Industries, Inc., Tokyo (JP)

( * ) Notice: Subject to any disclaimer, the term of this patent is extended or adjusted under 35 U.S.C. 154(b) by 366 days.

(21) Appl. No.: 16/494,912

(22) PCT Filed: Feb. 22, 2018

(86) PCT No.: PCT/JP2018/006478
§ 371 (c)(1),
(2) Date: Sep. 17, 2019

(87) PCT Pub. No.: WO2018/173617
PCT Pub. Date: Sep. 27, 2018

(65) Prior Publication Data
US 2020/0039114 A1    Feb. 6, 2020

(30) Foreign Application Priority Data

Mar. 23, 2017    (JP) .............................. JP2017-056926

(51) Int. Cl.
*B29B 11/00*    (2006.01)
*B29B 15/00*    (2006.01)
(Continued)

(52) U.S. Cl.
CPC ............. *B29B 15/125* (2013.01); *B29B 11/16* (2013.01); *B05C 3/15* (2013.01); *D06B 3/00* (2013.01)

(58) Field of Classification Search
CPC ......... B29B 11/00; B29B 11/10; B29B 11/16; B29B 15/00; B29B 15/10; B29B 15/12; B29B 15/125
See application file for complete search history.

(56) References Cited

U.S. PATENT DOCUMENTS 5,954,879 A    9/1999    Lison et al.
10,155,344 B2    12/2018    Junker et al.
(Continued)

FOREIGN PATENT DOCUMENTS

JP    01104624 A    4/1989
JP    01178412 A    7/1989
(Continued)

OTHER PUBLICATIONS

International Search Report and Written Opinion for International Application No. PCT/JP2018/006478 dated Apr. 10, 2018. 6 pages.

*Primary Examiner* — Jacob T Minskey
*Assistant Examiner* — Matthew Hoover
(74) *Attorney, Agent, or Firm* — RatnerPrestia

(57) ABSTRACT

The present invention relates to a method of producing a coating liquid impregnated sheet-like reinforcing fiber bundle formed by applying a coating liquid to a sheet-like reinforcing fiber bundle that is unidirectionally arranged continuous reinforcing fibers long in one direction. The present invention provides a production method and a coating device of a coating liquid impregnated sheet-like reinforcing fiber bundle, wherein the method and device can effect continuous running without clogging of generated fuzz even at a high running speed and effect efficient impregnation of a coating liquid into the sheet-like reinforc- (Continued)

ing fiber bundle. The present invention relates to a method of producing a coating liquid impregnated sheet-like reinforcing fiber bundle, including allowing a sheet-like reinforcing fiber bundle, which is unidirectionally arranged reinforcing fibers, to pass substantially vertically downward through the inside of a coating section storing a coating liquid, whereby the method provides the sheet-like reinforcing fiber bundle with the coating liquid; wherein the coating section includes a liquid pool and a narrowed section which are in communication with each other; wherein the liquid pool has a portion whose cross-sectional area decreases continuously along a running direction of the sheet-like reinforcing fiber bundle, and wherein the narrowed section has a slit-like cross-section and has a smaller cross-sectional area than the top side of the liquid pool.

27 Claims, 22 Drawing Sheets

(51) Int. Cl.
  *B29B 15/12* (2006.01)
  *B29B 11/16* (2006.01)
  *B05C 3/15* (2006.01)
  *D06B 3/00* (2006.01)

(56) References Cited

U.S. PATENT DOCUMENTS 10,239,970 B2  3/2019  Asano et al.

| | | | |
|---|---|---|---|
| 2012/0100362 A1* | 4/2012 | Ellis | C08J 5/24 |
| | | | 428/298.1 |
| 2013/0005855 A1 | 1/2013 | Arai et al. | |
| 2013/0106014 A1* | 5/2013 | Ishibashi | B29B 15/125 |
| | | | 264/103 |
| 2016/0303777 A1* | 10/2016 | Miyauchi | B29B 15/122 |
| 2017/0282465 A1 | 10/2017 | Kim et al. | |

FOREIGN PATENT DOCUMENTS

| | | |
|---|---|---|
| JP | 0550432 A | 3/1993 |
| JP | 0631821 A | 2/1994 |
| JP | 10511148 A | 10/1998 |
| JP | 3252278 B2 | 2/2002 |
| JP | 2011132389 A | 7/2011 |
| JP | 2013022868 A | 2/2013 |
| JP | 2015022799 A | 2/2015 |
| JP | 2016203397 A | 12/2016 |
| JP | 2017154330 A | 9/2017 |
| JP | 2017185770 A | 10/2017 |
| WO | 0128951 A2 | 4/2001 |
| WO | 2009142231 A1 | 11/2009 |
| WO | 2010150022 A1 | 12/2010 |
| WO | 2011118106 A1 | 9/2011 |
| WO | 2012002417 A1 | 1/2012 |
| WO | 2015060299 A1 | 4/2015 |
| WO | 2015076981 A1 | 5/2015 |
| WO | 2017068159 A1 | 4/2017 |

* cited by examiner

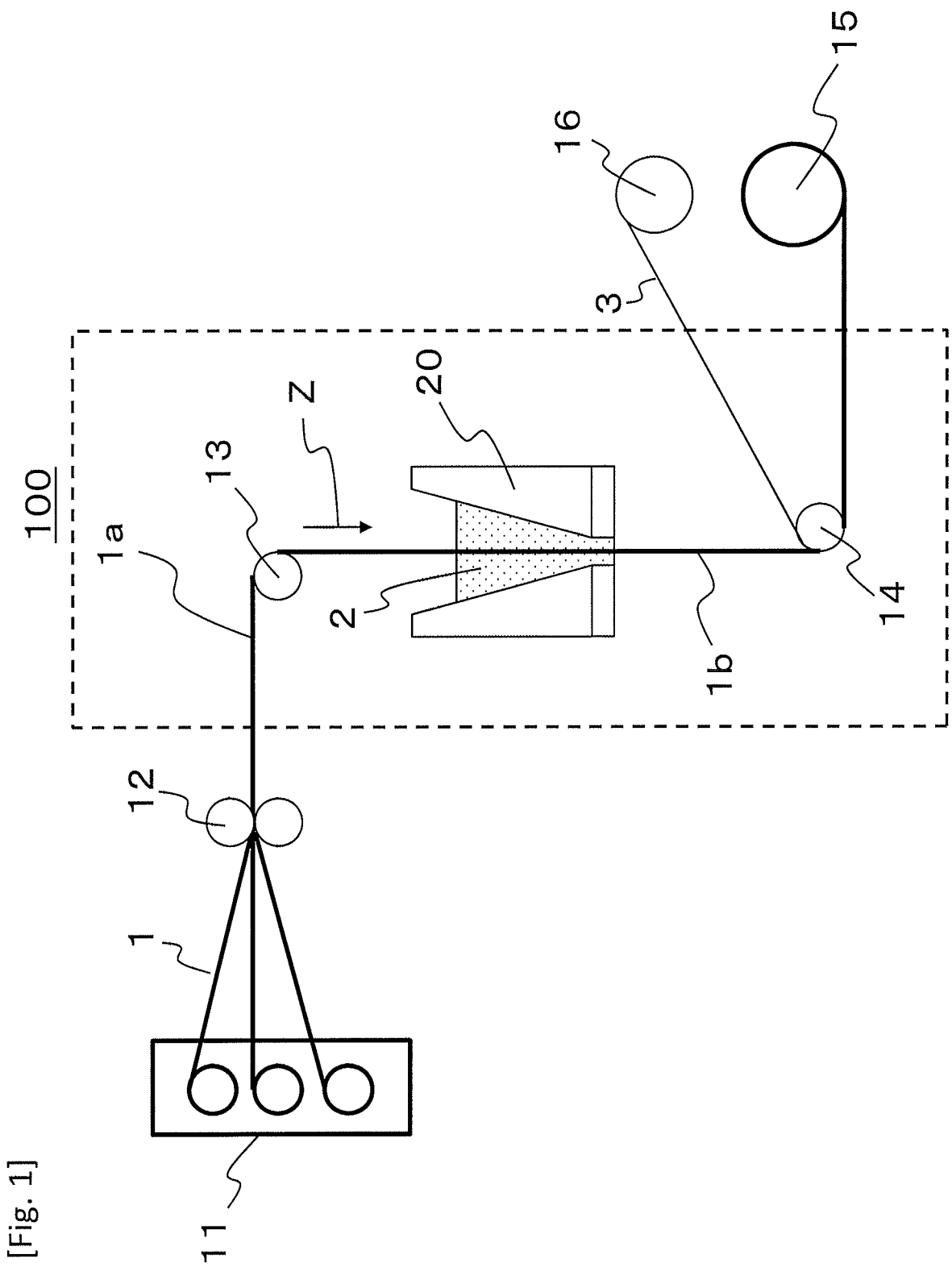
[Fig. 1]

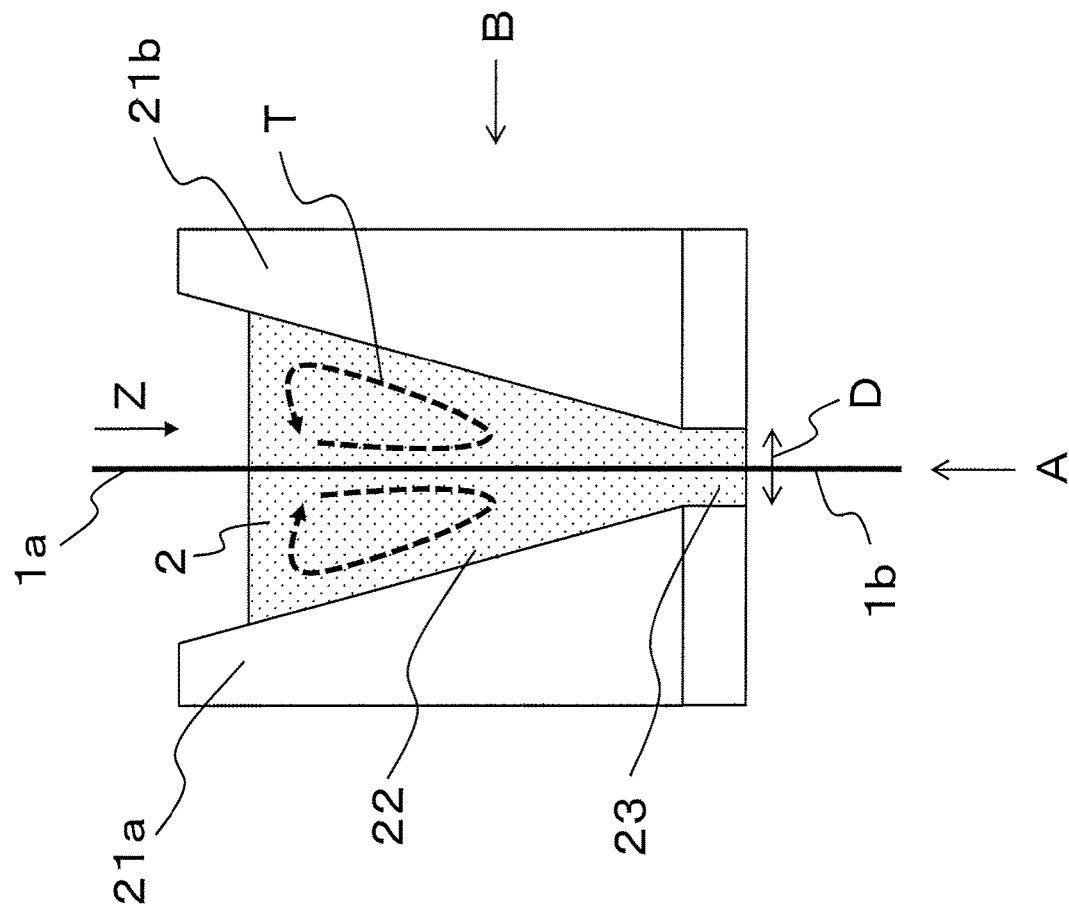

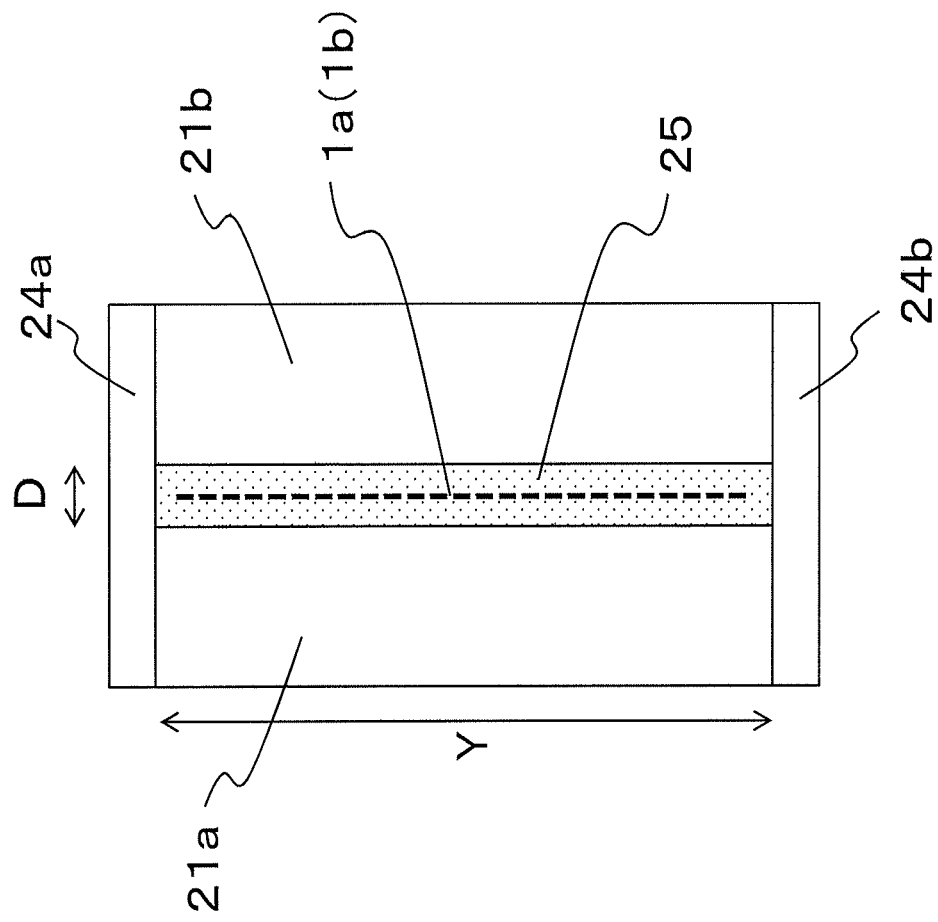

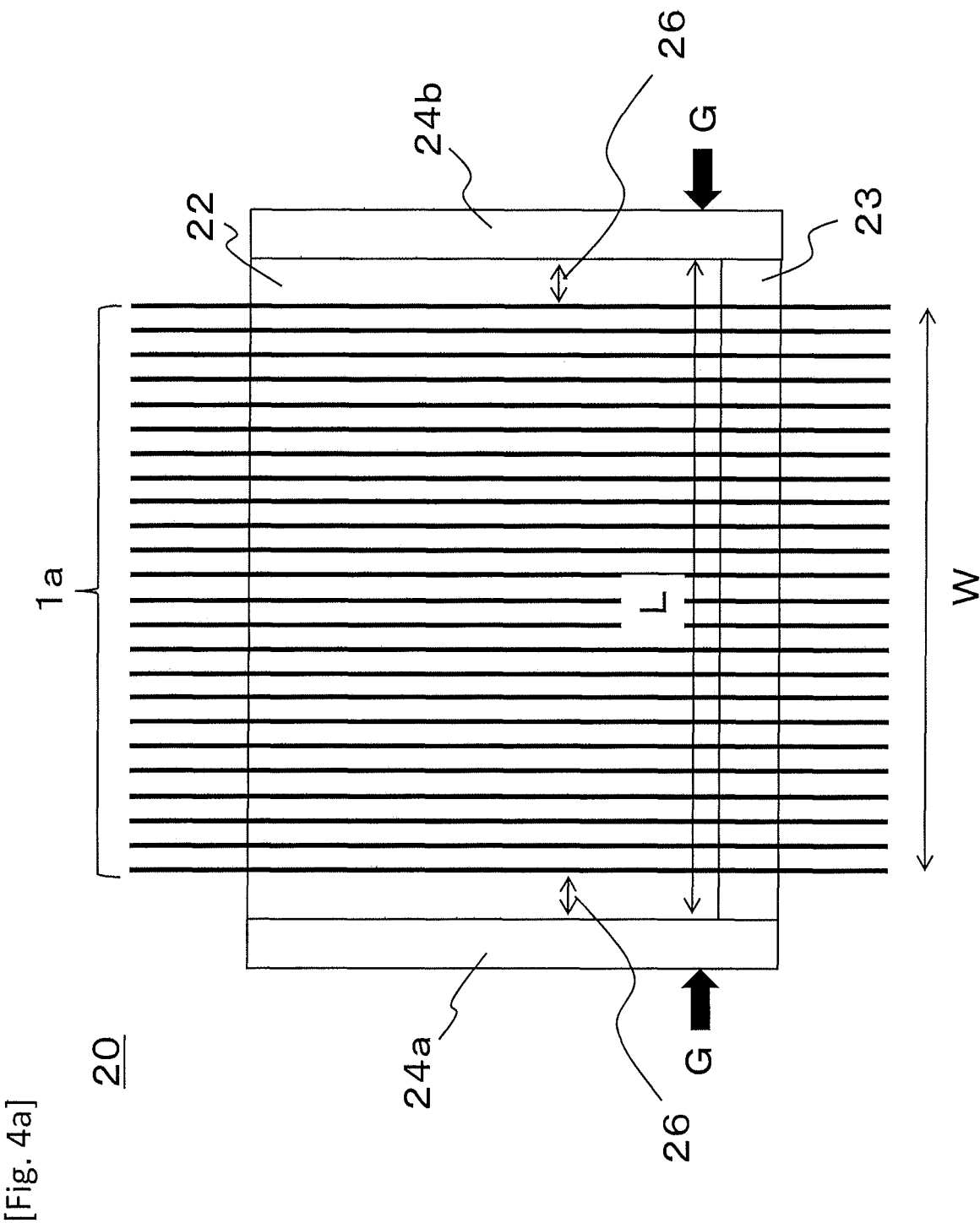

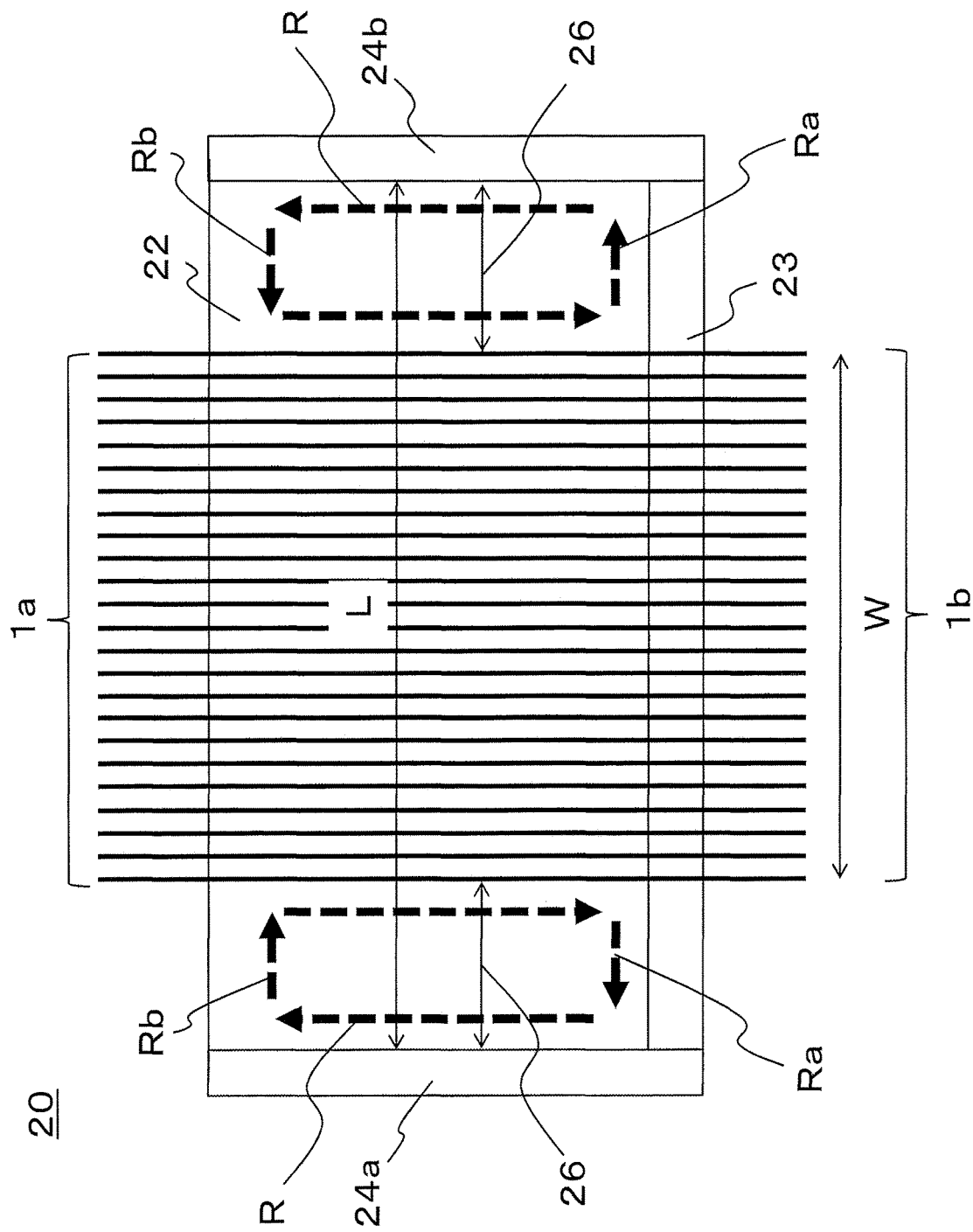

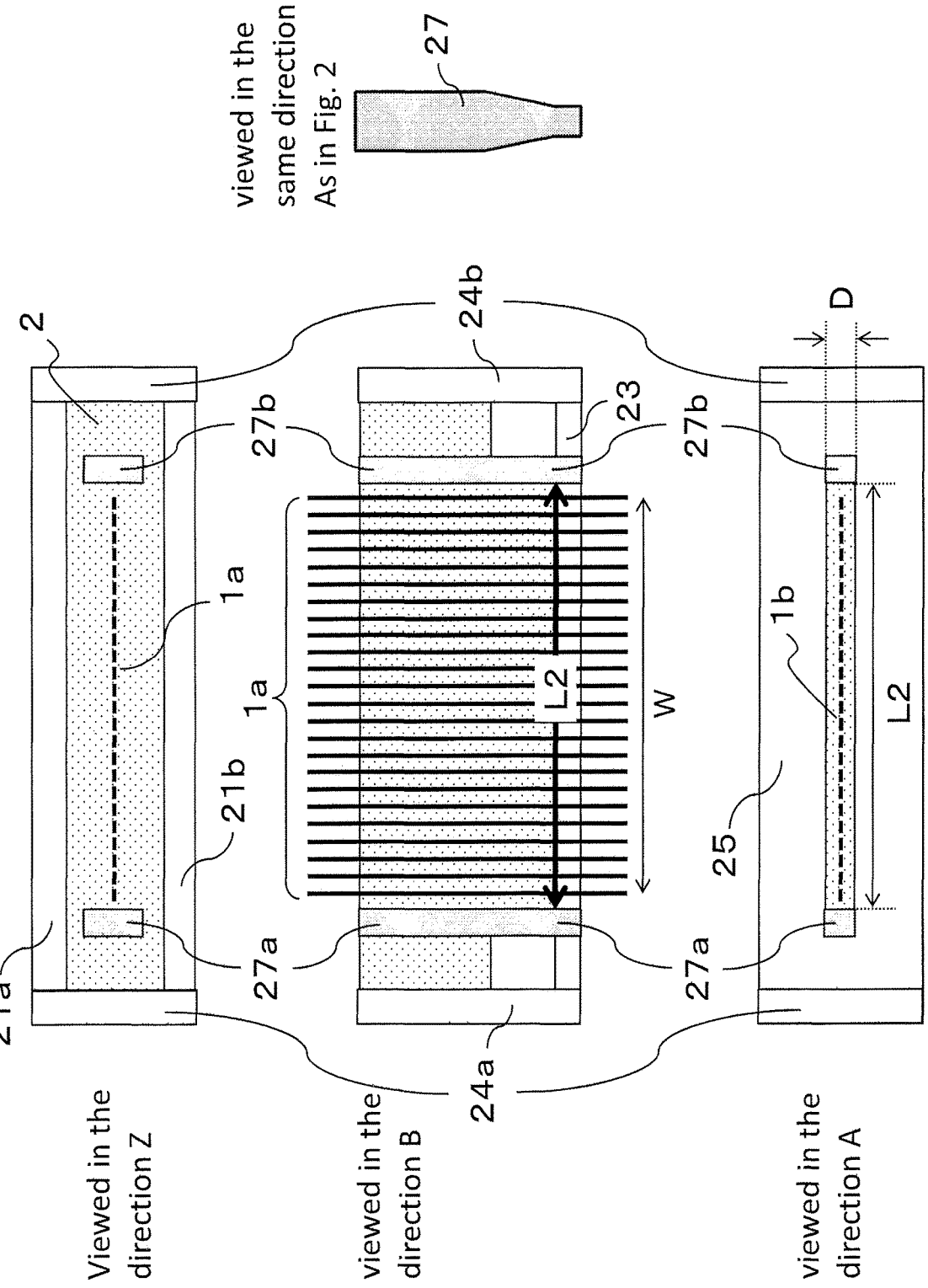
[Fig. 5]

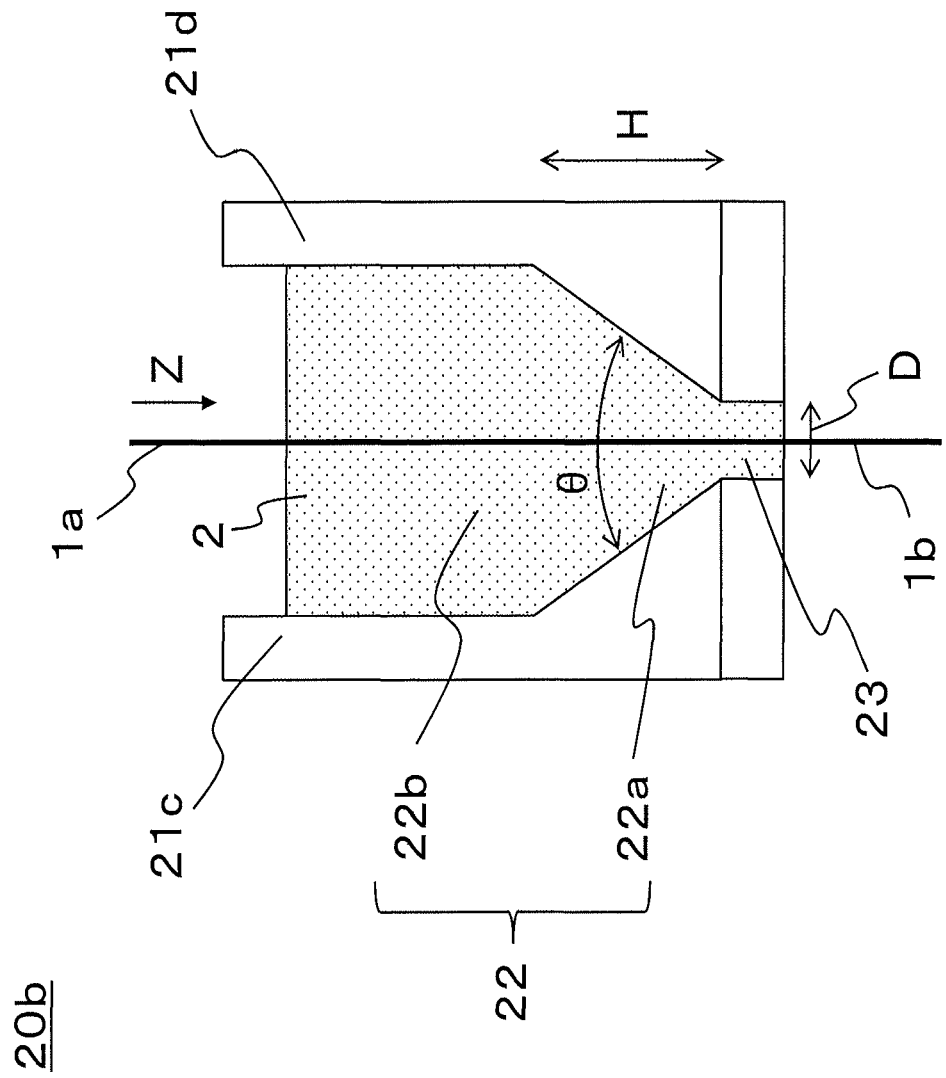
[Fig. 6]

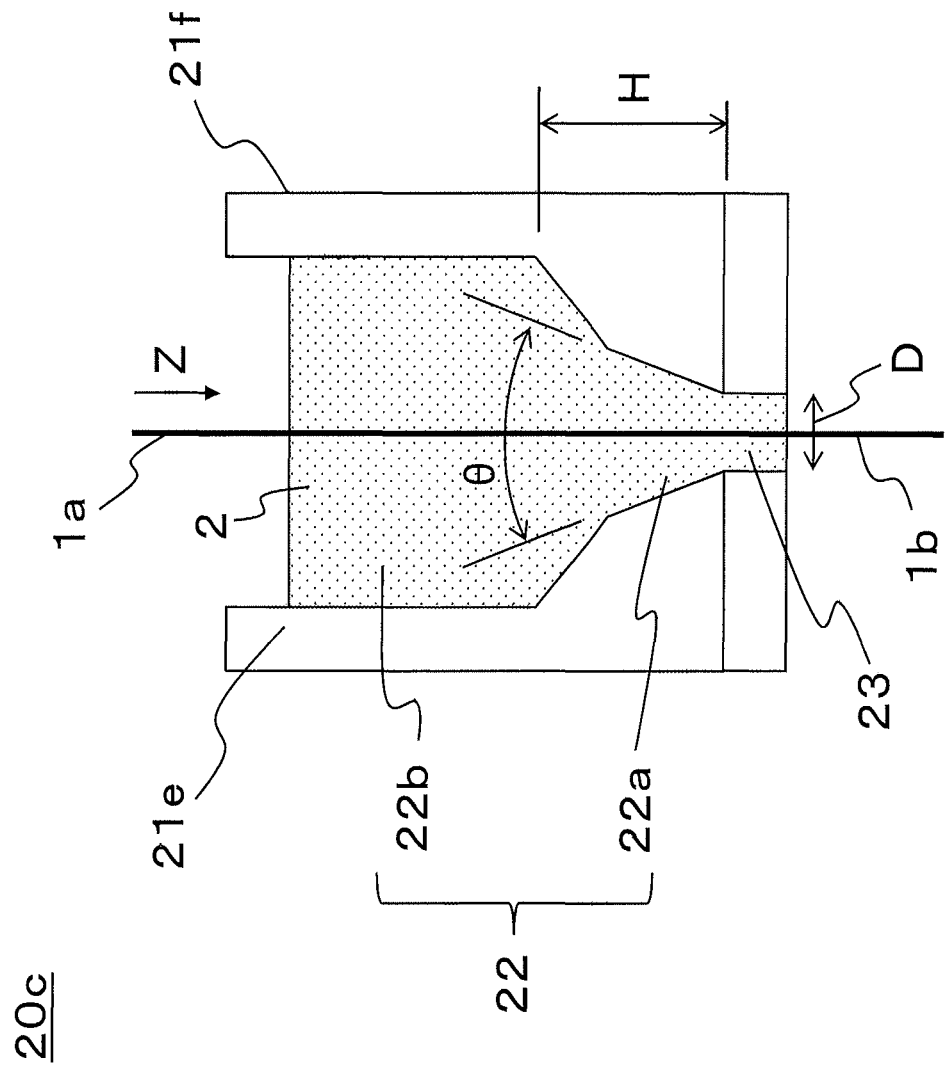
[Fig. 7]

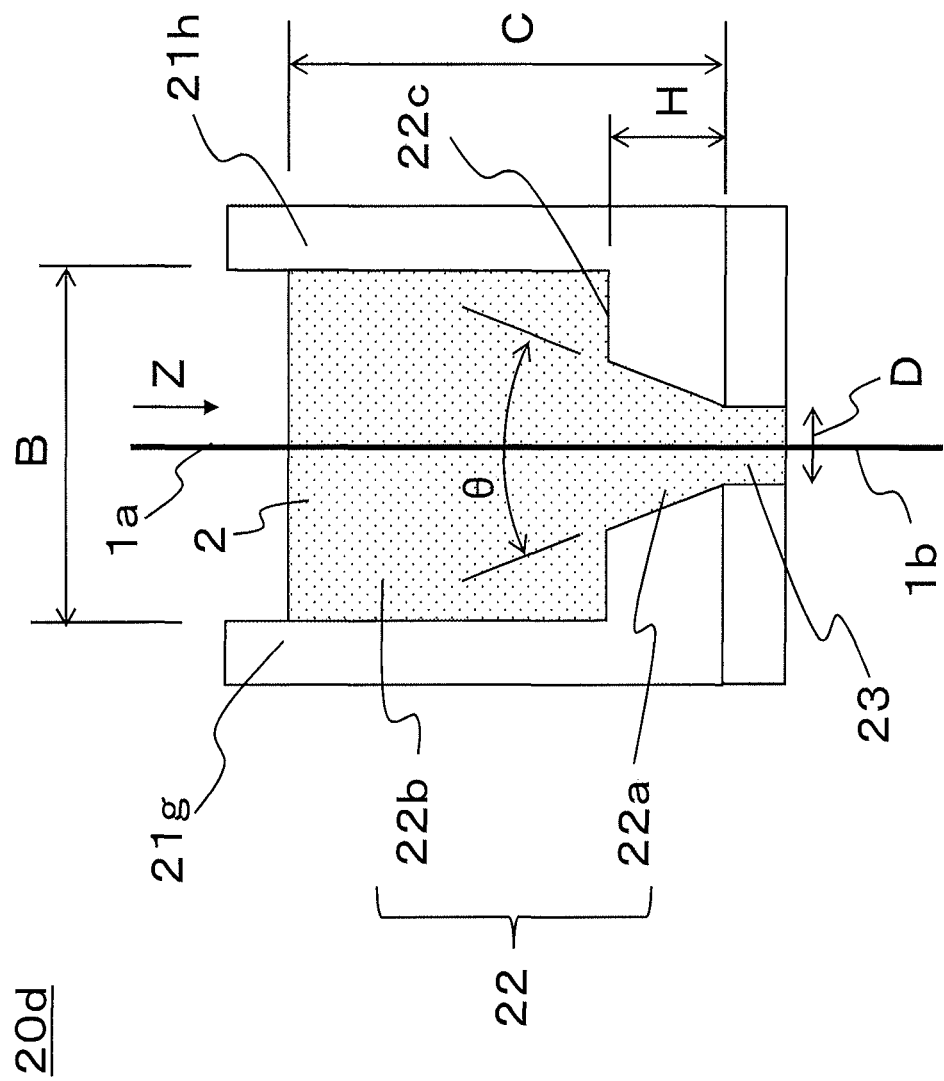
[Fig. 8]

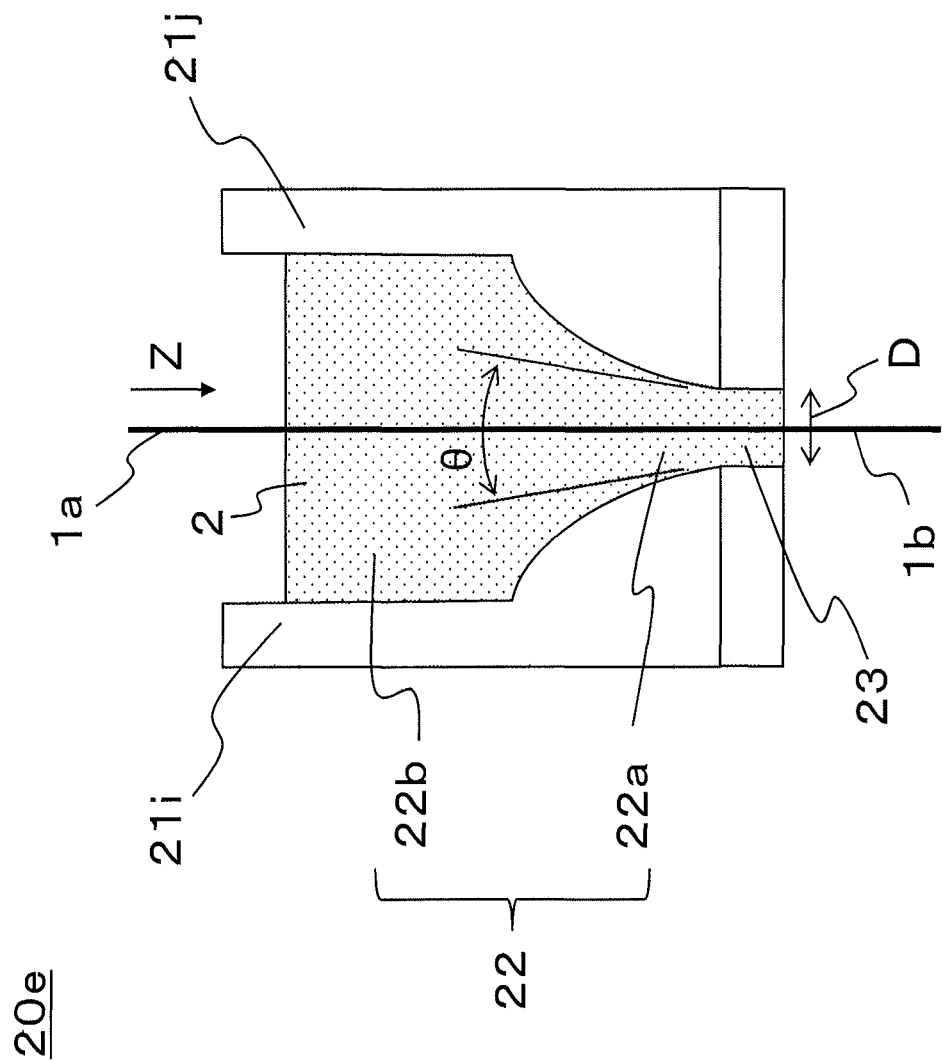
[Fig. 9]

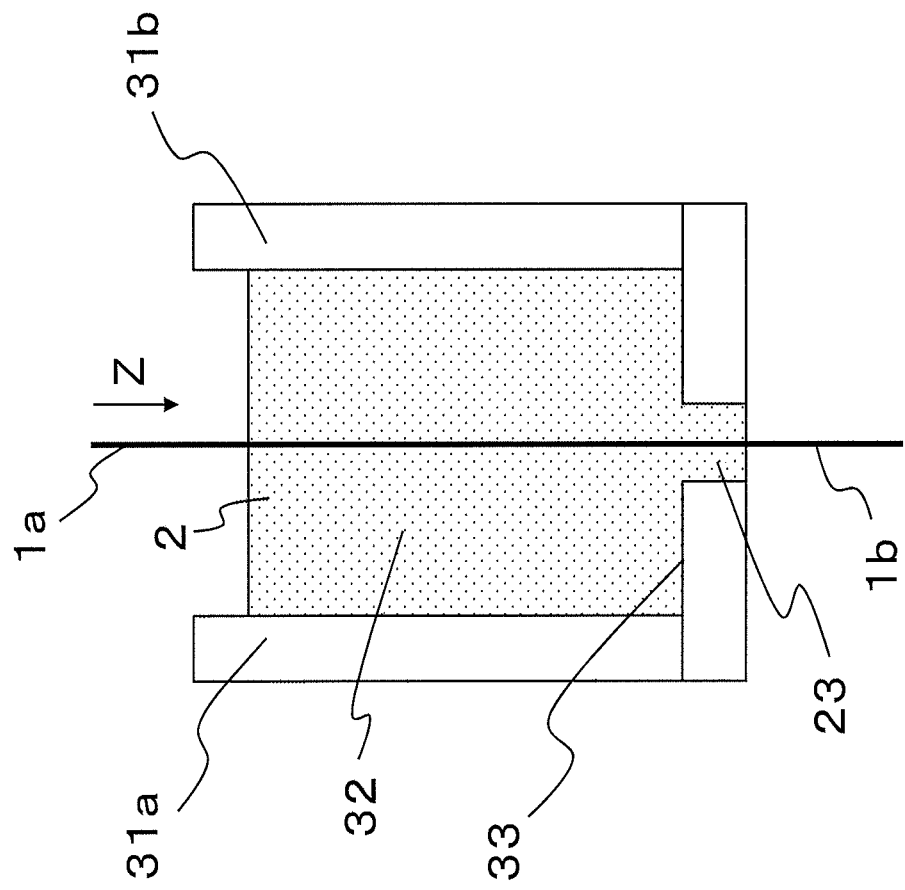
[Fig. 10]

[Fig. 11]
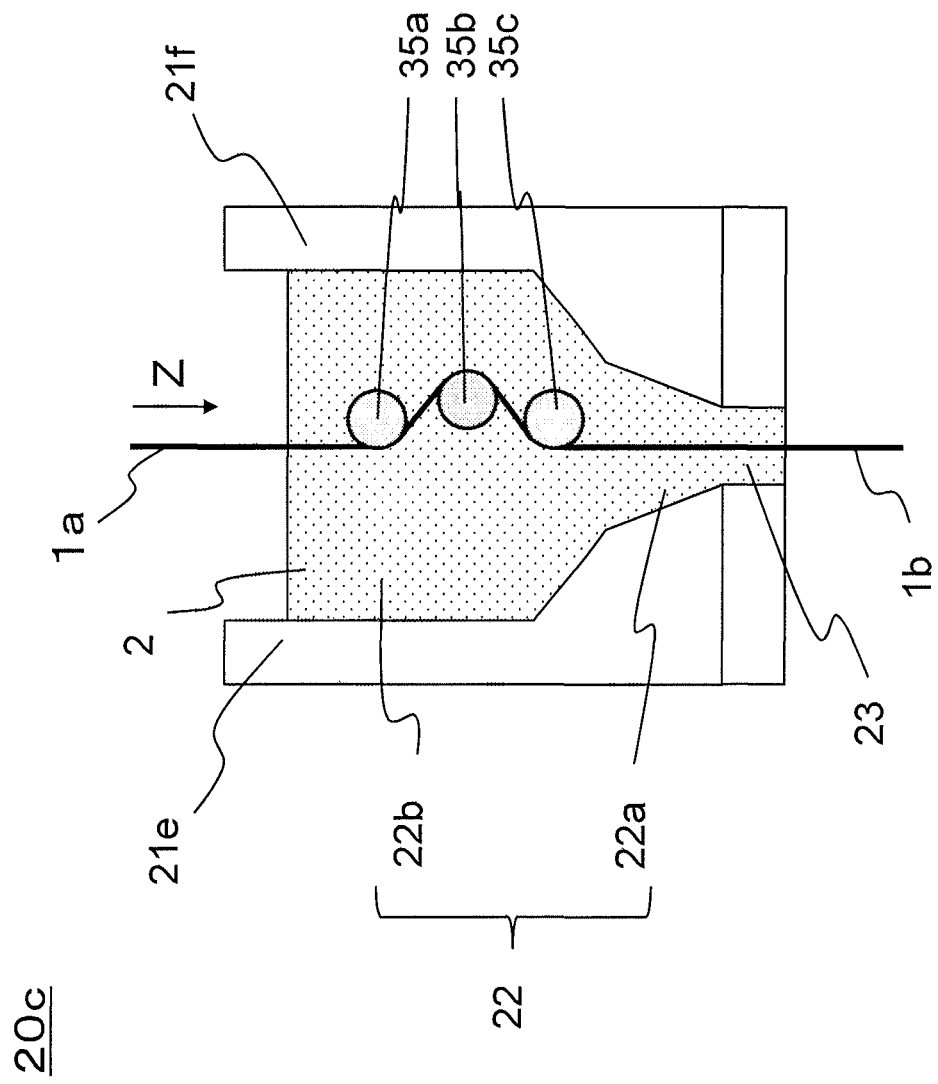

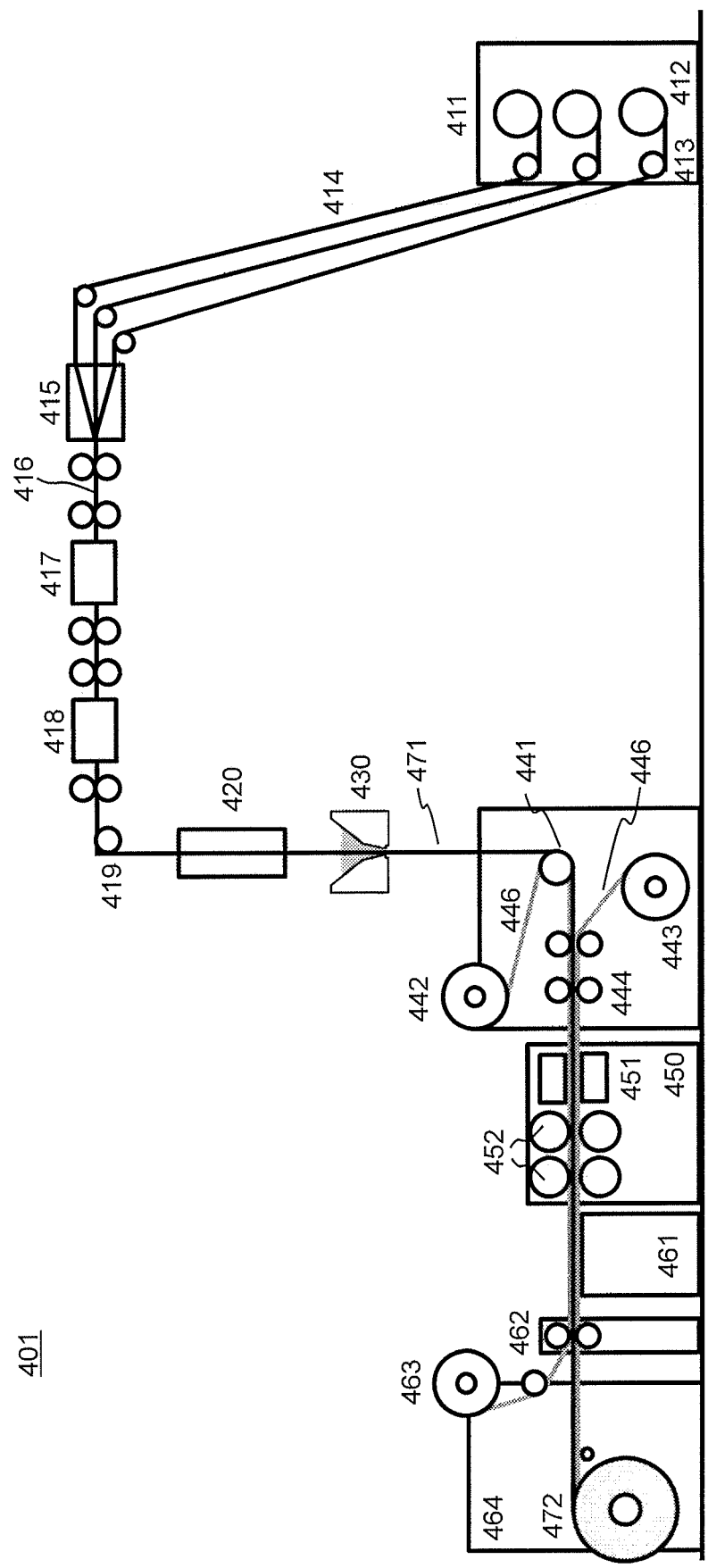
[Fig. 12]

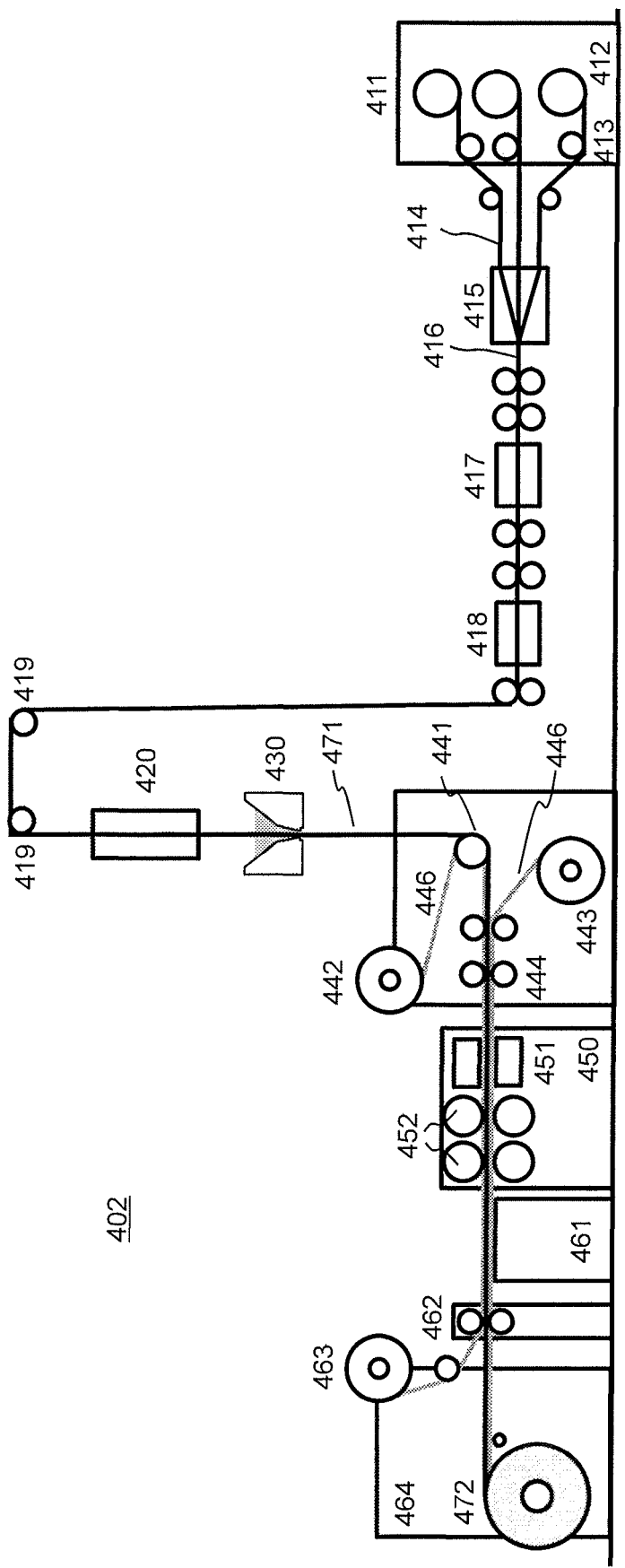
[Fig. 13]

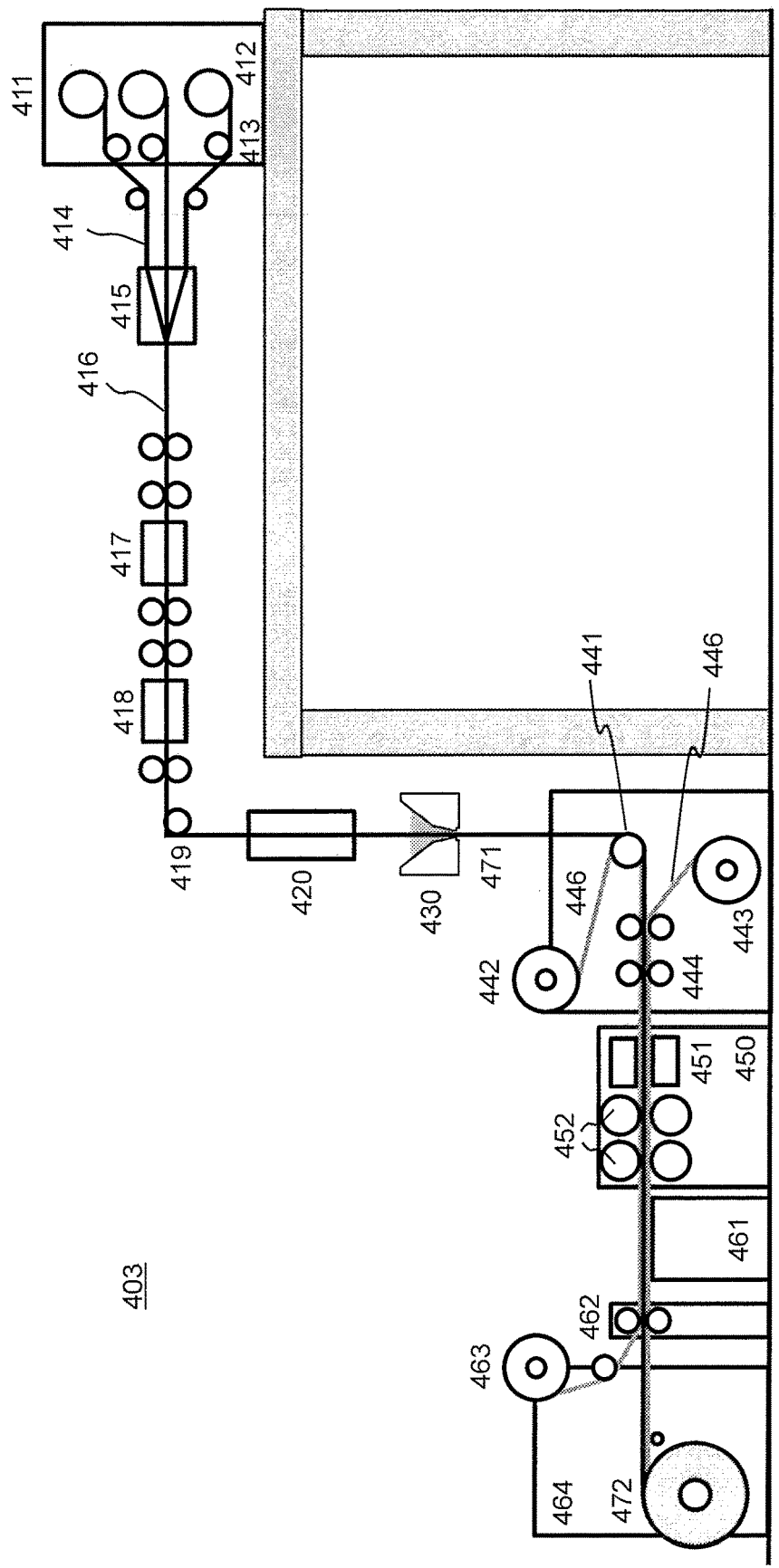
[Fig. 14]

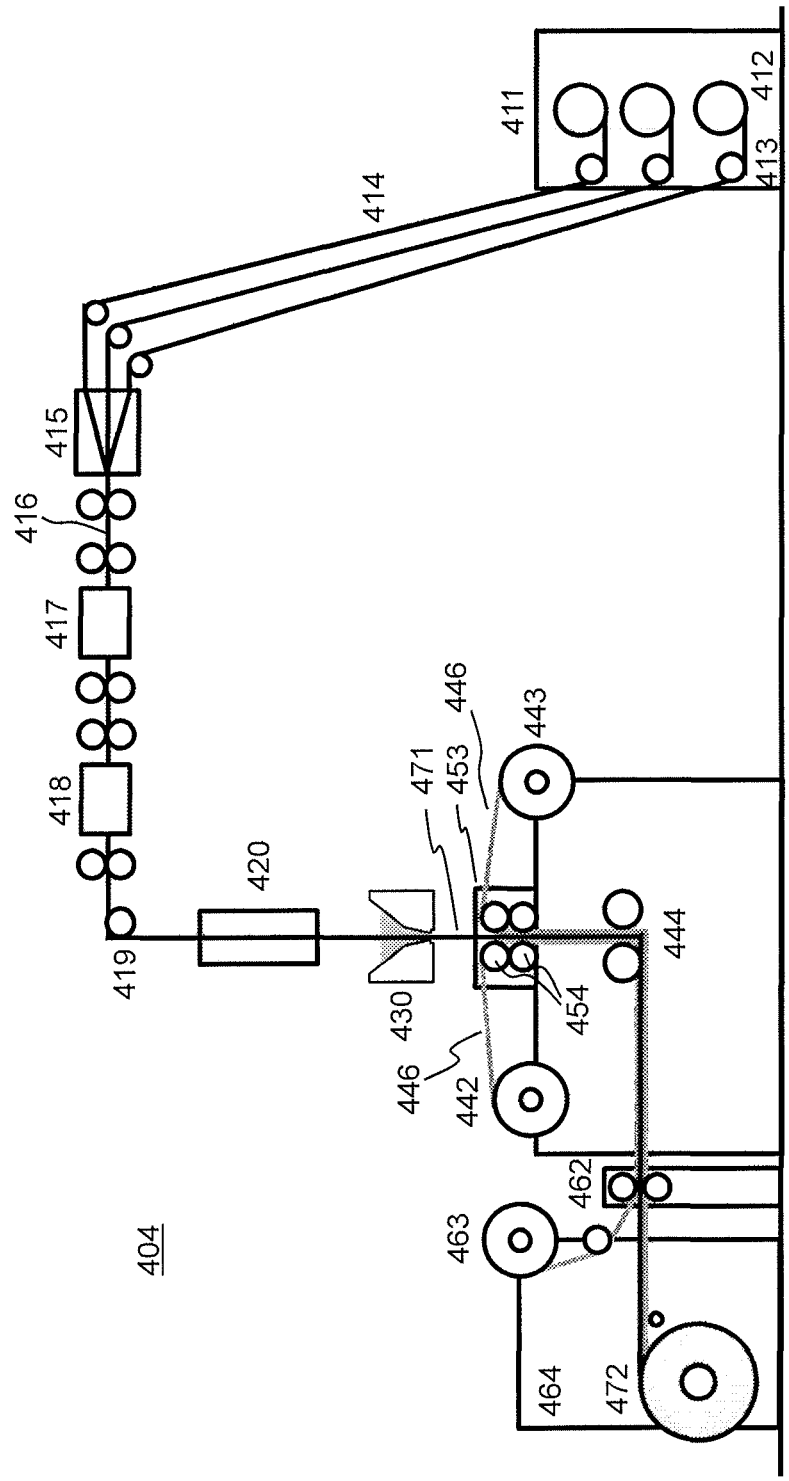
[Fig. 15]

[Fig. 16]
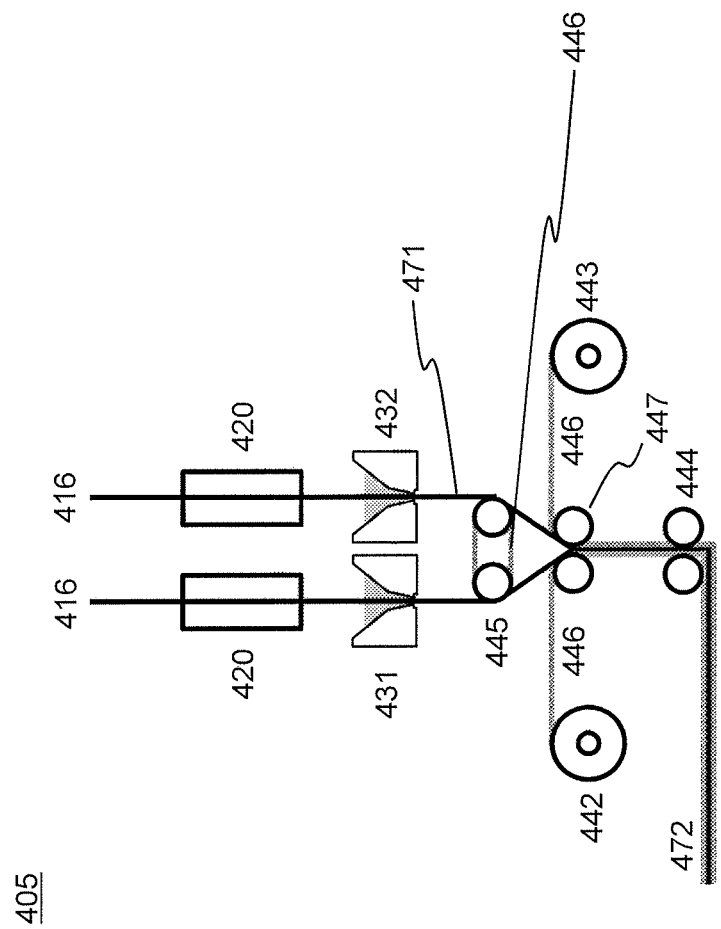

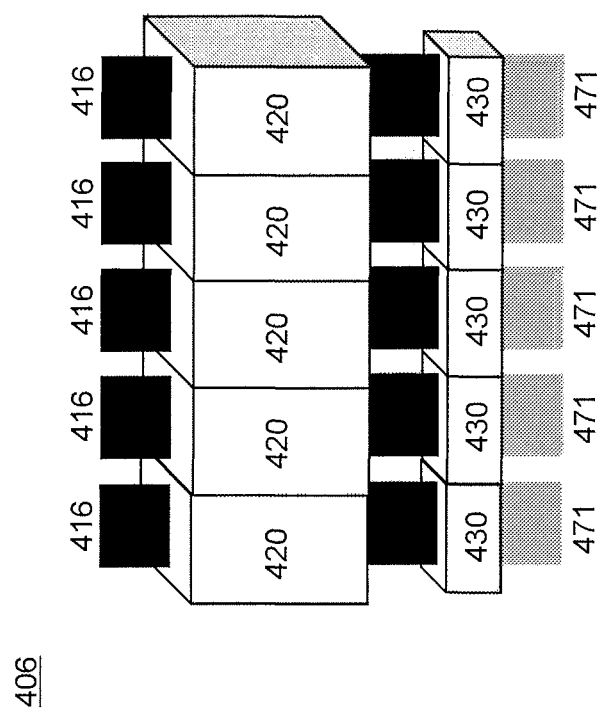
[Fig. 17]

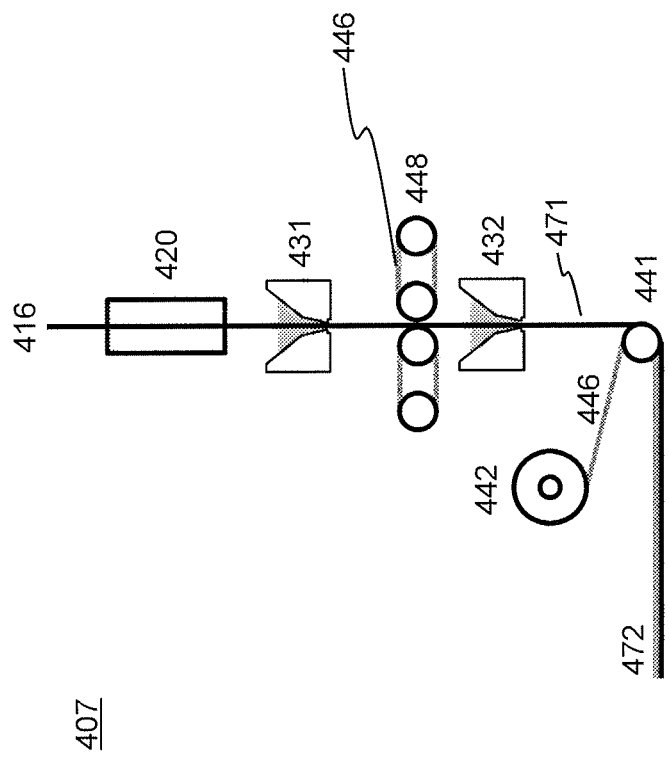
[Fig. 18]

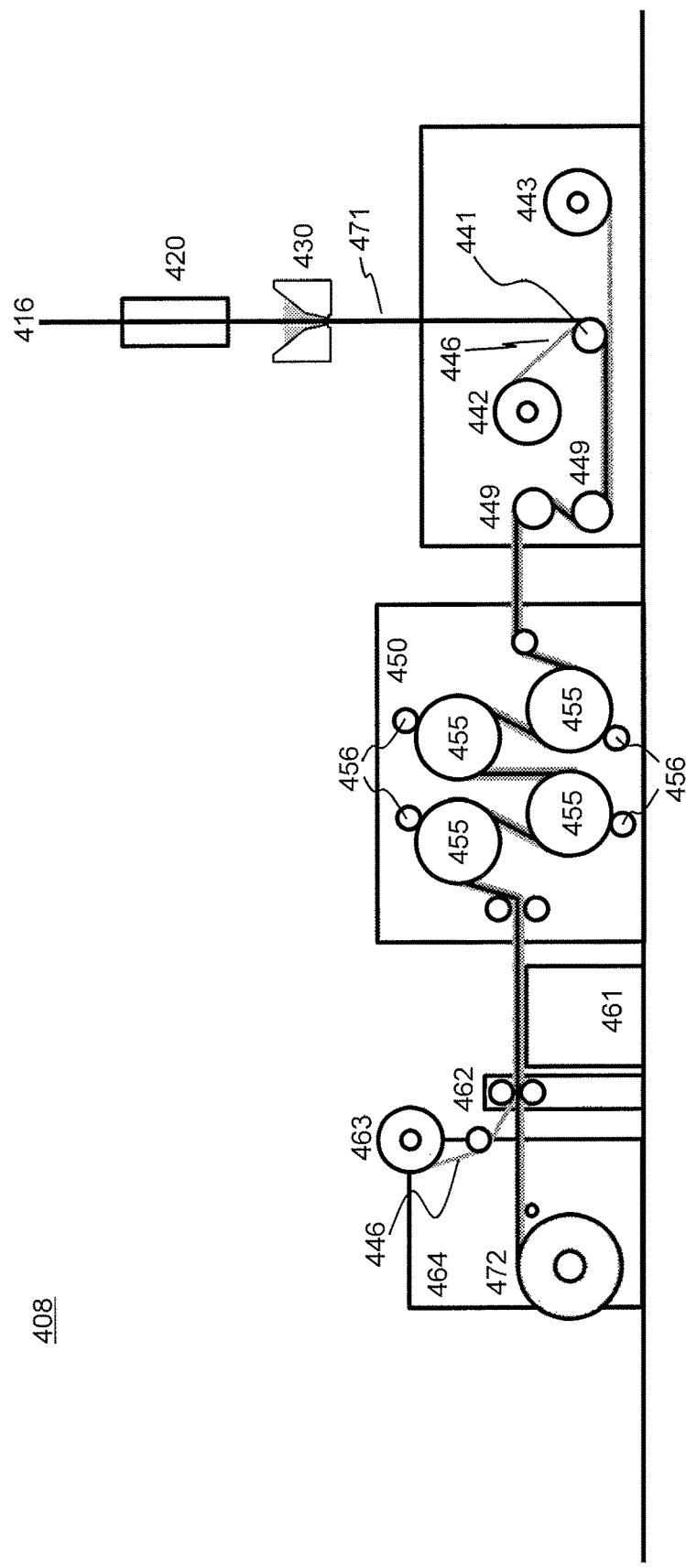

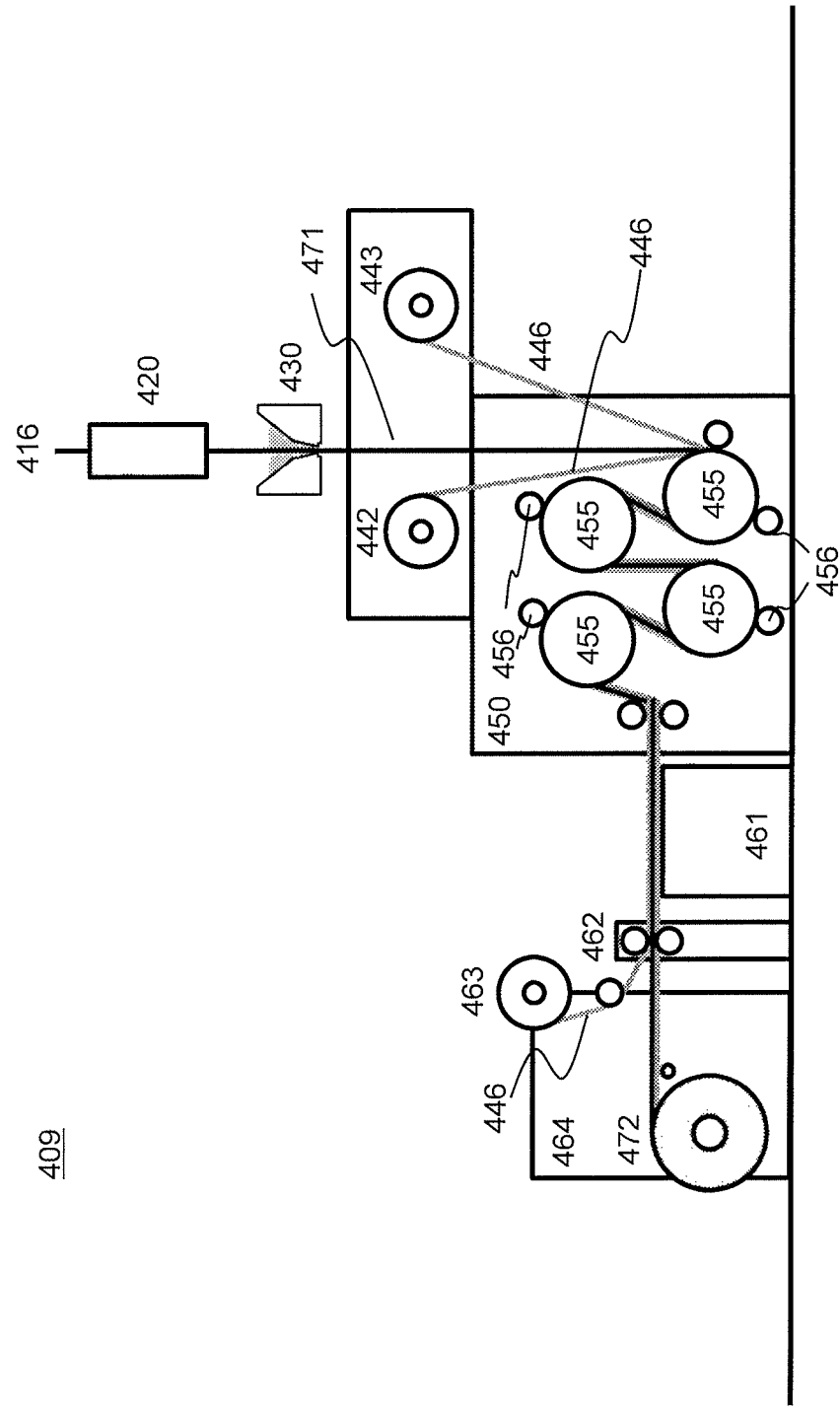
[Fig. 20]

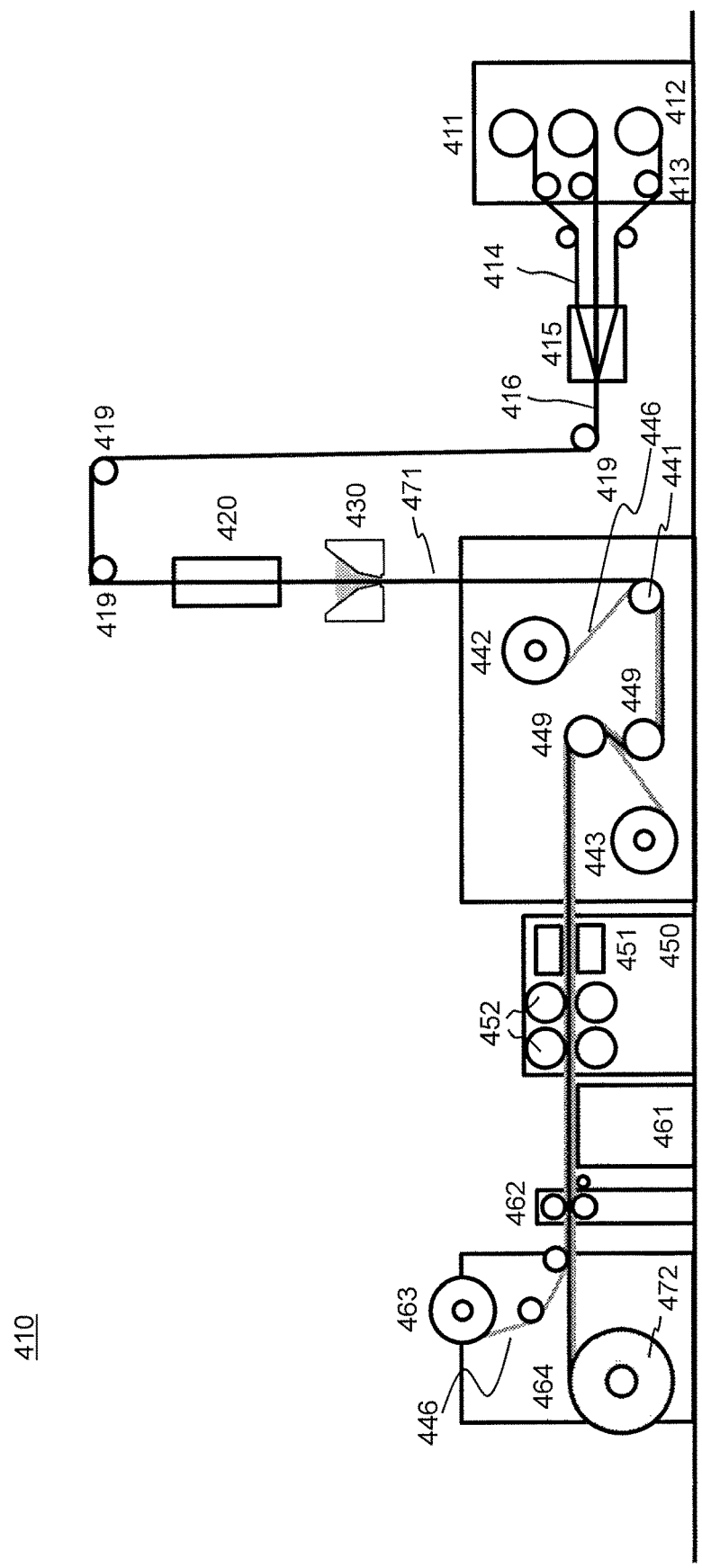
[Fig. 21]

PRODUCTION METHOD AND COATING DEVICE FOR COATING-LIQUID-IMPREGNATED SHEET-LIKE REINFORCING-FIBER BUNDLE AND SHEET-LIKE INTEGRATED OBJECT

CROSS REFERENCE TO RELATED APPLICATIONS

This is the U.S. National Phase application of PCT/JP2018/006478, filed Feb. 22, 2018, which claims priority to Japanese Patent Application No. 2017-056926, filed Mar. 23, 2017, the disclosures of each of these applications being incorporated herein by reference in their entirety for all purposes.

FIELD OF THE INVENTION

The present invention relates to a production method and a coating device for a coating liquid impregnated sheet-like reinforcing fiber bundle and a sheet-like integrated object, and particularly relates to a method and a device for impregnating a sheet-like reinforcing fiber bundle with a coating liquid uniformly.

BACKGROUND OF THE INVENTION

Fiber reinforced composite materials (FRP) in which a matrix resin containing a thermoplastic resin or a thermosetting resin is reinforced with a reinforcing fiber are used in various fields such as aerospace materials, automobile materials, industrial materials, pressure vessels, construction materials, housings, medical applications, and sports applications. Carbon fiber reinforced materials (CFRP) are widely and suitably used particularly in cases where a high mechanical property and lightness are required. On the other hand, in some of the cases where cost has priority over a mechanical property and lightness, glass fiber reinforced composite materials (GFRP) are used. FRP is obtained as an intermediate base material by impregnating a reinforcing fiber bundle with a matrix resin, the intermediate base material is laminated and molded and in addition, thermally cured if a thermosetting resin is used, and then, members composed of FRP are produced. In the above-mentioned applications, planar objects or objects formed by folding planar objects are often used, and two-dimensional sheet-like objects are more widely used as intermediate base materials of FRP than one-dimensional strands and roving-like objects, from the viewpoint of lamination efficiency and moldability achieved in producing such members.

In addition, an attempt to enhance production efficiency for members composed of FRP has recently promoted the mechanization and automation of lamination of sheet-like intermediate base materials, and here, narrow tape-like intermediate base materials are suitably used. Narrow tape-like intermediate base materials can be obtained by slicing broad sheet-like intermediate base materials into tapes having a desired width or impregnating narrow sheet-like reinforcing fiber bundles directly with matrix resins.

As two-dimensional sheet-like intermediate base materials, prepregs obtained by impregnating, with matrix resins, sheet-like reinforcing fiber bundles whose reinforced fibers are unidirectionally arranged are widely used. Examples of sheet-like reinforcing fiber bundles used for prepregs include unidirectional reinforcing fiber bundles obtained in sheet-like form by arranging reinforcing fibers unidirectionally and woven fabrics obtained by arranging reinforcing fibers multidirectionally. Unidirectionally arranged reinforcing fiber bundles are often used particularly in cases where a mechanical property has priority.

A hot-melt process that is one of the methods of producing prepregs is a method in which a matrix resin is melted and then applied onto release paper sheets, a laminated structure is produced in which a sheet-like reinforcing fiber bundle is sandwiched between the matrix resin sheets at the upper side and lower side of the bundle, and then, the inside of the sheet-like reinforcing fiber bundle is impregnated with the matrix resin by heat and pressure. There is a problem in that this method has many steps, cannot increase the production speed, and is costly.

For more efficient impregnation, for example, Patent Literature 1 has made a proposition. This is a method in which glass fiber is melted and spun, and the resulting spinning bundled in strand form or roving form is allowed to pass through a liquid pool filled with a thermoplastic resin and having a conical flow path.

As another example, Patent Literature 2 describes a method in which a coating film is formed on both faces of a sheet-like object simultaneously, but this is a method in which a sheet-like object is allowed to pass through a web-guide and coated using a pipe type doctor blade in order to prevent fluctuation of the sheet-like object in the formation of the coating film.

As a method of producing strip-like prepreg using a thermoplastic resin, a horizontal type pultrusion method is known in which a strip-like reinforcing fiber bundle is conveyed in the horizontal direction (cross direction) and is allowed to pass through a die, where the strip-like reinforcing fiber bundle is provided and impregnated with a thermoplastic resin (Patent Literature 3 and Patent Literature 4). According to Patent Literature 3, a tape-like reinforcing fiber is allowed to pass through a crosshead (in FIG. 2 in Patent Literature 3), and the tape-like reinforcing fiber bundle is provided with a resin immediately before a linear die in the crosshead. Patent Literature 4 explains that a plurality of strip-like reinforcing fiber bundles are separately introduced into a die filled with molten thermoplastic resin, widened, impregnated, and laminated using a fixed guide (for example, a squeeze bar), and finally withdrawn from the die as one sheet of prepreg.

PATENT LITERATURE

Patent Literature 1: WO 2001/028951
Patent Literature 2: JP 3252278 B2
Patent Literature 3: JP 06-031821 A
Patent Literature 4: WO 2012/002417

SUMMARY OF THE INVENTION

However, the method in Patent Literature 1 enables only a strand-like or roving-like object to be produced, and is not applicable to producing a sheet-like prepreg at which the present invention is directed. In addition, Patent Literature 1 explains that, in order to enhance impregnation efficiency, a thermoplastic resin fluid is allowed to strike against a side of the strand-like or roving-like reinforcing fiber bundle to actively generate turbulence in a conical flow path. This is considered to be intended to disturb part of the arrangement of the reinforcing fiber bundle so that the matrix resin can flow in, but applying this idea to a unidirectionally arranged reinforcing fiber bundle conceivably causes the arrangement of the reinforcing fiber bundle to be disturbed, resulting in not only degrading the grade of the prepreg but also decreasing the mechanical property of FRP.

In addition, the sheet-like object in Patent Literature 2 is a film, cloth, paper, foil, punching plate, network-like sheet material, or the like, and is not intended for a unidirectionally arranged reinforcing fiber bundle at which the present invention is directed. If the technology of Patent Literature 2 is applied to a unidirectionally arranged reinforcing fiber bundle composed of carbon fiber, abrasion at the web-guide generates fuzz, conceivably making it difficult for the unidirectionally arranged reinforcing fiber bundle to run. In addition, the technology of Patent Literature 2 is intended for coating with resin, not for impregnation.

According to the technology of Patent Literature 3, a tape-like reinforcing fiber passes through a slit-like guider chip with no resin in the fore portion of a die in a crosshead, and accordingly, the fore portion is more likely to be clogged with fuzz and also has no function for removing the fuzz, conceivably making it difficult to run the tape-like reinforcing fiber continuously for a long time. This tendency is considered to be remarkable particularly with carbon fiber, which is more likely to generate fuzz.

In addition, the method of Patent Literature 4 makes it more likely that fuzz is retained in a liquid pool during continuous production and that the fuzz clogs a pultrusion portion. There is a problem in that, in particular, running a strip-like reinforcing fiber bundle continuously at a high speed causes the frequency of clogging with fuzz to be very high, and accordingly, enables production to be carried out only at a very low speed and fails to increase productivity. In addition, a horizontal type pultrusion method makes it necessary to seal the die hermetically to prevent liquid leakage and makes it insufficient to collect fuzz during continuous production. Furthermore in the horizontal type pultrusion method, impregnating the inside of a sheet-like reinforcing fiber bundle with a coating liquid causes bubbles remaining in the strip-like reinforcing fiber bundle to be discharged, by ascending force, in a direction perpendicular to the orientation direction of the reinforcing fiber bundle (in the thickness direction of the strip-like reinforcing fiber bundle), and accordingly, the discharge of the bubbles progresses in such a manner that the bubbles push away the coating liquid in-coming for impregnation. Because of this, there is a problem in that not only the movement of the bubbles is inhibited by the liquid, but also the impregnation with the coating liquid is inhibited by the bubbles, resulting in low impregnation efficiency. In this regard, Patent Literature 4 also proposes exhausting bubbles through a vent, but the exhaustion takes place only near the outlet of a die, and the effect of the exhaustion is considered to be limitative.

Thus, an efficient method of applying a coating liquid to a unidirectionally arranged reinforcing fiber bundle, particularly an efficient method of producing a sheet-like prepreg using a unidirectional reinforcing fiber bundle has not been established yet.

An object of the present invention relates to a method of producing a coating liquid impregnated sheet-like reinforcing fiber bundle, and is to provide a production method and a coating device for a coating liquid impregnated sheet-like reinforcing fiber bundle, wherein generation of fuzz is suppressed, continuous production is possible without clogging with fuzz, a sheet-like reinforcing fiber bundle is efficiently impregnated with a coating liquid, and the production speed can be made higher.

The above-mentioned problem is solved by the method of producing a coating liquid impregnated sheet-like reinforcing fiber bundle according to the present invention, which includes allowing a sheet-like reinforcing fiber bundle, which is unidirectionally arranged reinforcing fibers, to pass substantially vertically downward through the inside of a coating section storing a coating liquid, whereby the method provides the sheet-like reinforcing fiber bundle with the coating liquid; wherein the coating section includes a liquid pool and a narrowed section which are in communication with each other; wherein the liquid pool has a portion whose cross-sectional area decreases continuously along a running direction of the sheet-like reinforcing fiber bundle, and wherein the narrowed section has a slit-like cross-section and has a smaller cross-sectional area than the top side of the liquid pool.

In addition, the present invention provides the method of producing a coating liquid impregnated sheet-like reinforcing fiber bundle, wherein the sheet-like reinforcing fiber bundle is heated and then introduced into the liquid pool.

In addition, the present invention provides the method of producing a coating liquid impregnated sheet-like reinforcing fiber bundle, wherein the sheet-like reinforcing fiber bundle is smoothed and then introduced into the liquid pool.

In addition, the present invention provides the method of producing a coating liquid impregnated sheet-like reinforcing fiber bundle, wherein the sheet-like reinforcing fiber bundle is widened and then introduced into the liquid pool.

In addition, the method of producing a sheet-like integrated object according to the present invention is a method including: obtaining a coating liquid impregnated sheet-like reinforcing fiber bundle by the above-mentioned method of producing a coating liquid impregnated sheet-like reinforcing fiber bundle; providing at least one side of the obtained coating liquid impregnated sheet-like reinforcing fiber bundle with a release sheet to form a sheet-like integrated object; and taking up the sheet-like integrated object.

In addition, the present invention provides the method of producing a sheet-like integrated object, wherein the sheet-like integrated object is formed and then subjected to after-impregnation.

Furthermore, the coating device according to the present invention is a coating device for providing a sheet-like reinforcing fiber bundle, which is unidirectionally arranged reinforcing fibers, with a coating liquid, the coating device including a running mechanism which allows the sheet-like reinforcing fiber bundle to run substantially vertically downward; and a coating mechanism, wherein the coating mechanism is capable of storing the coating liquid in the inside thereof, and further includes a liquid pool and a narrowed section which are in communication with each other, wherein the liquid pool has a portion whose cross-sectional area decreases continuously along the running direction of the sheet-like reinforcing fiber bundle, and wherein the narrowed section has a slit-like cross-section and has a smaller cross-sectional area than the top side of the liquid pool.

In addition, the present invention provides a device for producing a sheet-like integrated object including: a mechanism for arranging reinforcing fibers to form a sheet-like reinforcing fiber bundle; a mechanism for heating the sheet-like reinforcing fiber bundle; the coating device; a device for supplying a release sheet; a nip roll and/or an S-shaped arranged roll; and a winder.

Furthermore, the present invention provides a prepreg produced using the above-mentioned production method and/or production device.

In addition, the present invention provides a prepreg tape obtained by slitting the prepreg.

Furthermore, the present invention provides a fiber reinforced composite material obtained by molding the prepreg and/or the prepreg tape.

The method of producing a coating liquid impregnated sheet-like reinforcing fiber bundle according to the present invention makes it possible to significantly suppress and prevent clogging with fuzz. Furthermore, the method enables the sheet-like reinforcing fiber bundle to be run continuously at a high speed, and enhances the productivity of the sheet-like reinforcing fiber bundle provided with a coating liquid.

Furthermore, the method makes it possible to obtain a sheet-like reinforcing fiber bundle impregnated uniformly with a coating liquid.

BRIEF DESCRIPTION OF THE DRAWINGS

FIG. 1 is a schematic cross-sectional view depicting the production method and coating device of a coating liquid impregnated sheet-like reinforcing fiber bundle according to one embodiment of the present invention.

FIG. 2 is an enlarged detail cross-sectional view of the coating section 20 portion in FIG. 1.

FIG. 3 is a bottom side view of the coating section 20 in FIG. 2, as viewed in the direction A in FIG. 2.

FIG. 4a is a cross-sectional view depicting the structure of the inside of the coating section 20 in FIG. 2, as viewed in the direction B in FIG. 2.

FIG. 4b is a cross-sectional view depicting the flow of the coating liquid 2 in the clearance gap 26 in FIG. 4a.

FIG. 5 is a view depicting an installation example of a width regulation mechanism.

FIG. 6 is a detail cross-sectional view of the coating section 20b according to an embodiment other than in FIG. 2.

FIG. 7 is a detail cross-sectional view of the coating section 20c according to an embodiment other than in FIG. 6.

FIG. 8 is a detail cross-sectional view of the coating section 20d according to an embodiment other than in FIG. 6.

FIG. 9 is a detail cross-sectional view of the coating section 20e according to an embodiment other than in FIG. 6.

FIG. 10 is a detail cross-sectional view of the coating section 30 according to an embodiment other than of the present invention.

FIG. 11 is a view depicting an aspect in which the liquid pool includes bars, wherein the aspect is an example of an embodiment of the present invention.

FIG. 12 is a schematic diagram depicting an example of a process/device of producing a prepreg using the present invention.

FIG. 13 is a schematic diagram of an example of another process/device of producing a prepreg using the present invention.

FIG. 14 is a schematic diagram of an example of another process/device of producing a prepreg using the present invention.

FIG. 15 is a schematic diagram of an example of another process/device of producing a prepreg using the present invention.

FIG. 16 is a diagram depicting an example of an aspect in which a plurality of coating liquid impregnated sheet-like reinforcing fiber bundles are laminated, wherein the aspect is according to one embodiment of the present invention.

FIG. 17 is a diagram depicting an example of an aspect in which a plurality of coating sections are included, wherein the aspect is according to one embodiment of the present invention.

FIG. 18 is a diagram depicting an example of another aspect in which a plurality of coating sections are included, wherein the aspect is according to one embodiment of the present invention.

FIG. 19 is a schematic diagram of an example of another process/device of producing a prepreg using the present invention.

FIG. 20 is a schematic diagram of an example of another process/device of producing a prepreg using the present invention.

FIG. 21 is a schematic diagram of another process/device of producing a prepreg using the present invention.

DETAILED DESCRIPTION OF EMBODIMENTS OF THE INVENTION

Preferred embodiments of the present invention will be described with reference to the drawings. In this regard, the following description illustrates embodiments of the present invention, the present invention is not to be construed as limited to the embodiments, and various modifications can be made to the invention to the extent that they do not depart from the object and effect of the present invention.

<Outline of Production Method and Coating Device of Coating Liquid Impregnated Sheet-like Reinforcing Fiber Bundle>

First, the outline of the method of producing a coating liquid impregnated sheet-like reinforcing fiber bundle according to the present invention will be described with reference to FIG. 1. FIG. 1 is a schematic cross-sectional view depicting the production method and device of a coating liquid impregnated sheet-like reinforcing fiber bundle according to one embodiment of the present invention. A coating device 100 includes: conveyance rolls 13 and 14 as a running mechanism for running a sheet-like reinforcing fiber bundle 1a in the substantially vertically downward direction Z; and a coating section 20 as a coating mechanism that is disposed between the conveyance rolls 13 and 14 and stores a coating liquid 2. Also before and after the coating device 100, it is possible to provide a plurality of creels 11 for unwinding reinforcing fibers 1, an arrangement device 12 for obtaining a sheet-like reinforcing fiber bundle 1a in which the unwound reinforcing fibers 1 are arranged unidirectionally (arranged in the depth direction of the page in FIG. 1), and a wind-up device 15 for a coating liquid impregnated sheet-like reinforcing fiber bundle 1b, and in addition, the coating device 100 is equipped with a supply device for a coating liquid, though the supply device is not shown in the drawing. In addition, the coating device 100 can be equipped with a release sheet supply device 16 for supplying a release sheet 3, if necessary.

<Sheet-Like Reinforcing Fiber Bundle>

Here, examples of the reinforcing fiber 1 include carbon fibers, glass fibers, metal fibers, metal oxide fibers, metal nitride fibers, organic fibers (aramide fibers, polybenzoxazole fibers, polyvinyl alcohol fibers, polyethylene fibers, and the like), and the like, and carbon fibers are preferably used, from the viewpoint of the mechanical property and lightness of FRP.

In addition, a unidirectionally arranged sheet-like reinforcing fiber bundle refers to a plurality of reinforcing fibers arranged unidirectionally in a plane, and the plurality of reinforcing fibers do not necessarily have to be integrated, for example, by intertangling. That is, the sheet-like reinforcing fiber bundle is termed so for convenience to represent a state in which the reinforcing fibers are arranged, because the production method according to the present invention makes it possible that a sheet-like object impregnated with a coating liquid is obtained when the object has been coated with the coating liquid. A resin impregnated sheet-like object which is unidirectionally arranged reinforcing fibers serves as a base material of FRP, which is called a "unidirectional material" or "UD material" in the composite material industry. Here, the sheet-like reinforcing fiber bundle is not limited to a particular thickness or width, and the thickness and the width can suitably be selected in accordance with the purpose or application. In the case of carbon fiber, usually approximately 1,000 to 1,000,000 single fibers assembled in tape form are called a "tow", and such tows can be arranged to obtain a sheet-like reinforcing fiber bundle, but tows may be laminated in the thickness direction. In this regard, a sheet-like reinforcing fiber bundle is easy to handle and accordingly preferable when the aspect ratio defined using the width and thickness is 10 or more. In the present invention, one tape-like "tow" is understood to be one form of the sheet-like reinforcing fiber bundle.

In addition, the method used to form a sheet-like reinforcing fiber bundle may be a known method and is not limited to a particular one, and it is preferable from the viewpoints of process efficiency and arrangement uniformity to preliminarily arrange single fibers to form a reinforcing fiber bundle, followed by further arranging the reinforcing fiber bundle to form a sheet-like reinforcing fiber bundle. For example, in the case of carbon fiber, a "tow" that is a tape-like reinforcing fiber bundle is wound on a bobbin as above-mentioned, and a sheet-like reinforcing fiber bundle can be obtained by arranging the tape-like reinforcing fiber bundle withdrawn from the bobbin. In addition, it is preferable to have a reinforcing fiber arrangement mechanism for orderly arranging reinforcing fiber bundles withdrawn from the bobbins fit onto the creels so that there can be no undesirable overlapping nor folding in the reinforcing fiber bundles in the sheet-like reinforcing fiber bundle and no split between the reinforcing fiber bundles. As a reinforcing fiber arrangement mechanism, a known roller, a comb type of arrangement device, or the like can be used. In addition, layering a plurality of sheets of preliminarily arranged sheet-like reinforcing fiber bundles is useful with a view to decreasing split between the reinforcing fibers. In this regard, the creels are preferably provided with a tension control mechanism operated when the reinforcing fibers are withdrawn. As a tension control mechanism, a known one can be used, and examples thereof include a braking mechanism. In addition, tension can also be controlled, for example, by adjusting a yarn guide.

<Smoothing of Sheet-like Reinforcing Fiber Bundle>

In the present invention, increasing the surface smoothness of the sheet-like reinforcing fiber bundle can enhance the uniformity of the coating amount in the coating section. For this reason, the sheet-like reinforcing fiber bundle is preferably introduced into the liquid pool after it is smoothed. The smoothing treatment method is not limited to a particular one, and examples thereof include a method in which physical pressure is applied using opposing rolls or the like and a method in which reinforcing fibers are moved using air flow. A method in which physical pressure is applied is easy and convenient, less likely to disturb the arrangement of the reinforced fibers, and accordingly preferable. More specifically, calendering or the like can be used. The method in which air flow is used not only is less likely to cause abrasion but also has the effect of widening a sheet-like reinforcing fiber bundle, and accordingly, is preferable.

<Widening of Sheet-Like Reinforcing Fiber Bundle>

In the present invention, it is also preferable with a view to enabling a thin prepreg to be produced efficiently that the sheet-like reinforcing fiber bundle is introduced into the liquid pool after it is treated for widening of the fiber bundle. The treatment method of widening of the fiber bundle is not limited to a particular one, and examples thereof include a method in which vibration is applied mechanically, a method in which the reinforcing fiber bundle is expanded using air flow, and the like. Examples of methods in which vibration is applied mechanically include a method in which a sheet-like reinforcing fiber bundle is brought in contact with vibrating rolls, as described, for example, in JP 2015-22799 A. As to the vibration direction, vibration is preferably applied in the Y-axis direction (horizontal direction) or the Z-axis direction (vertical direction), assuming that the running direction of the sheet-like reinforcing fiber bundle is the X-axis. It is also preferable to use a combination of the horizontally vibrating rolls and the vertically vibrating rolls. In addition, providing a plurality of projections on the surface of the vibration roll makes it possible to suppress abrasion of the reinforcing fiber on the roll, and accordingly is preferable. As a method in which air flow is used, for example, a method described in SEN-I GAKKAISHI, vol. 64, P-262-267 (2008) can be used.

<Preheating of Sheet-Like Reinforcing Fiber Bundle>

In the present invention, introducing the sheet-like reinforcing fiber bundle into the liquid pool after heating the bundle suppresses a decrease in the temperature of the coating liquid and enhances the viscosity uniformity of the coating liquid, and accordingly, is preferable. The sheet-like reinforcing fiber bundle is preferably heated up to or to the vicinity of the temperature of the coating liquid, and examples of various heating means that can be used for this purpose include air heating, infrared heating, far-infrared heating, laser heating, contact heating, heat medium heating (e.g. steam), and the like. Among others, an infrared heating device is easy and convenient and can directly heat the sheet-like reinforcing fiber bundle sheet, and accordingly, can achieve efficient heating up to a desired temperature even at a high running speed, and is preferable.

<Coating Liquid>

A coating liquid used in the present invention can suitably be selected in accordance with the purpose of the application, and, for example, for the application of a coating liquid to production of sheet-like prepreg, a coating liquid made of a matrix resin can be used. A coating liquid impregnated sheet-like reinforcing fiber bundle coated with a matrix resin and obtained according to the present invention is in a state in which the sheet-like reinforcing fiber bundle is impregnated with a matrix resin, and the coating liquid impregnated sheet-like reinforcing fiber bundle can be directly laminated and molded as a sheet-like prepreg to afford members composed of FRP. The degree of impregnation can be controlled in accordance with the design of the coating section and through after-impregnation carried out after coating. A matrix resin can suitably be selected in accordance with the application, and a thermoplastic resin or thermosetting resin is generally used. The matrix resin may be a molten resin melted by heating or a matrix resin which is a coating liquid at room temperature. In addition, the matrix resin may be formed into a solution or varnish using a solvent.

Examples of matrix resins that can be used include matrix resins generally used for FRP, such as thermoplastic resins, thermosetting resins, and photo-curable resins. If these are liquids at room temperature, they may be directly used. If they are solids or viscous liquids at room temperature, they may be heated to decrease the viscosity, may be melted to be used as a melt, or may be dissolved in a solvent to be used as a solution or varnish.

Examples of thermoplastic resins that can be used include polymers having, in the principal chain, a bond selected from a carbon-carbon bond, an amide bond, an imide bond, an ester bond, an ether bond, a carbonate bond, a urethane bond, a urea bond, a thioether bond, a sulfone bond, an imidazole bond, and a carbonyl bond. Specific examples include polyacrylate, polyolefin, polyamide (PA), aramid, polyester, polycarbonate (PC), polyphenylenesulfide (PPS), polybenzimidazole (PBI), polyimide (PI), polyetherimide (PEI), polysulfone (PSU), polyethersulfone (PES), polyetherketone (PEK), polyetheretherketone (PEEK), polyetherketoneketone (PEKK), polyaryletherketone (PAEK), polyamideimide (PAI), and the like. In fields requiring heat resistance, such as aircraft applications, PPS, PES, PI, PEI, PSU, PEEK, PEKK, PEAK, and the like are suitable. In industrial and automobile applications, PA, polyester, PPS, a polyolefin such as polypropylene (PP), and the like are suitable in order to increase molding efficiency. These may be polymers, or oligomers or monomers may be used, because of the low viscosity and low temperature coating. Needless to say, these may be copolymerized depending on the purpose, or various kinds of them can be mixed to be used as polymer blends/alloys.

Examples of thermosetting resins include epoxy resins, maleimide resins, polyimide resins, resins having an acetylene terminal, resins having a vinyl terminal, resins having an allyl terminal, resins having a nadic acid terminal, and resins having a cyanate ester terminal. These can be used generally in combination with a hardener or a curing catalyst. In addition, these thermosetting resins can suitably be used in mixture.

As thermosetting resins suitable for the present invention, epoxy resins are suitably used because epoxy resins have excellent heat resistance, chemical resistance, and mechanical property. In particular, amines, phenols, and epoxy resins whose precursor is a compound having a carbon-carbon double bond are preferable. Specific examples include, but are not limited to: epoxy resins whose precursors are amines, such as various isomers of tetraglycidyl diaminodiphenylmethane, triglycidyl-p-aminophenol, triglycidyl-m-aminophenol, and triglycidylaminocresol; epoxy resins whose precursors are phenols, such as bisphenol A epoxy resins, bisphenol F epoxy resins, bisphenol S epoxy resins, phenol novolac epoxy resins, and cresol novolac epoxy resins; epoxy resins whose precursors are compounds having a carbon-carbon double bond, such as alicyclic epoxy resins; and the like. Bromated epoxy resins resulting from bromating these epoxy resins are also used. Epoxy resins whose precursors are aromatic amines typified by tetraglycidyl diaminodiphenylmethane are most suitable for the present invention because the epoxy resins have good heat resistance and good adhesiveness to reinforcing fibers.

Thermosetting resins are preferably used in combination with hardeners. For example, for epoxy resins, a hardener can be used if the hardener is a compound having an active group capable of reacting with an epoxy group. Preferably, compounds having an amino group, an acid anhydride group, or an azido group are suitable. Specifically, various isomers of dicyandiamide and diaminodiphenyl sulfone are, and amino benzic acid ester types are, suitable. According to specific description, dicyandiamide provides excellent storage stability of prepreg, and accordingly, is used by preference. In addition, various isomers of diaminodiphenyl sulfone afford cured objects having favorable heat resistance, and accordingly, are most suitable for the present invention. As amino benzic acid ester types, trimethyleneglycol di-p-aminobenzoate and neopentylglycol di-p-aminobenzoate are used by preference even though their heat resistance is low, because they have excellent tensile strength compared with diaminodiphenyl sulfone, and accordingly, are used selectively in accordance with the application. Needless to say, a curing catalyst can also be used, if necessary. In addition, a hardener or a curing catalyst and a complexing agent capable of forming a complex can be used together, with a view to enhancing the pot life of a coating liquid.

In the present invention, a mixture of a thermosetting resin and a thermoplastic resin is also suitably used. A mixture of a thermosetting resin and a thermoplastic resin affords better results than a thermosetting resin used singly. This is because a thermosetting resin and a thermoplastic resin have antinomic characteristics, that is, a thermosetting resin is generally disadvantageouly brittle but can be molded at low pressure in an autoclave, and contrarily, a thermoplastic resin is generally advantageously tough but difficult to mold at low pressure in an autoclave, and accordingly, using these in mixture can effect a balance between properties and moldability. Such a mixture to be used preferably contains more than 50 mass % thermosetting resin, from the viewpoint of the mechanical property of FRP obtained by curing prepreg.

<Polymer Particle>

In the present invention, use of a coating liquid containing polymer particles is also preferable because the use can enhance the toughness and impact resistance of the obtained CFRP. In this case, the glass transition temperature (Tg) or melting temperature (Tm) of polymer particles which is 20° C. or more higher than the temperature of a coating liquid makes it easier to retain the form of the polymer particle in the coating liquid, and accordingly is preferable. Tg of polymer particles can be measured under the following conditions using a temperature-modulated DSC. As a temperature-modulated DSC device, Q 1000 manufactured by TA Instruments, Inc. is suitable, and this can be used on the basis of calibration carried out using high-purity indium under a nitrogen atmosphere. The measurement conditions can be based on a temperature ramp rate of 2° C./min., and the temperature-modulation condition can be based on a cycle of 60 seconds and an amplitude of 1° C. The reversible components are separated from the total heat flow obtained under these conditions, and the temperature at the midpoint of the step signal can be regarded as Tg.

In addition, Tm can be measured using a common DSC at a temperature ramp rate of 10° C./min., and the temperature at the peak top of the peak-shaped signal corresponding to melting is regarded as Tm.

In addition, the polymer particles are preferably insoluble in a coating liquid, and as such polymer particles, suitable ones described in, for example, WO 2009/142231 as a reference can be used. More specifically, polyamides and polyimides are preferably used, and polyamides that have excellent toughness and accordingly can significantly enhance the impact resistance are most preferable. Examples of polyamides that can be suitably used include nylon 12, nylon 11, nylon 6, nylon 66, nylon 6/12 copolymers, a nylon modified to have a semi-IPN (macromolecular interpenetrating network structure) with an epoxy compound described in Example 1 of JP 01-104624 A (semi-IPN nylon), and the like. As to the shape of this thermoplastic resin particle, the particle may be a spherical particle, a nonspherical particle, or a porous particle, and the spherical shape is particularly preferable in the production method according to the present invention in order not to decrease the resin flow property. In addition, the spherical shape is preferred also because the spherical shape has no starting point for stress concentration and affords high impact resistance.

Examples of commercially available polyamide particles that can be used include SP-500, SP-10, TR-1, TR-2, 842P-48, 842P-80 (which are all manufactured by Toray Industries, Inc.), "Orgasol (registered trademark)" 1002D, 2001UD, 2001EXD, 2002D, 3202D, 3501D, 3502D (which are all manufactured by Arkema K. K.), "Grilamid (registered trademark)" TR90 (manufactured by Emser Werke, Inc.), "TROGAMID (registered trademark)" CX7323, CX9701, CX9704 (manufactured by Degussa AG), and the like. These polyamide particles may be used singly or two or more kinds thereof may be used in combination.

In addition, polymer particles are preferably retained in the interlayer resin layer of CFRP in order to impart high toughness to the interlayer resin layer. For this, the number average particle size of the polymer particle is preferably in the range from 5 to 50 μm, more preferably in the range from 7 to 40 μm, still more preferably in the range from 10 to 30 μm. Having a number average particle size of 5 μm or more makes it possible that the particles do not intrude into the reinforcing fiber bundle, but are retained in the interlayer resin layer of the obtained fiber reinforced composite material. Having a number average particle size of 50 μm or less makes it possible that the thickness of the matrix resin layer on the surface of the prepreg is made suitable, and eventually that the fiber mass content in the obtained CFRP is made suitable.

<Coating Liquid Viscosity>

A coating liquid used in the present invention preferably has an optimal viscosity selected from the viewpoint of processability and stability. Specifically, it is preferable to have a viscosity in the range from 1 to 60 Pa·s because such a viscosity makes it possible that drip of the coating liquid at the outlet of the narrowed section is suppressed and that the high-speed running properties and stable running properties of the sheet-like reinforcing fiber bundle are enhanced. As used herein, a viscosity refers to one measured at a strain rate of $3.14\ s^{-1}$ at a coating liquid temperature in the liquid pool. As a measurement device, a viscoelasticity measurement device such as of a parallel disc type or a conical type can be used. The viscosity of the coating liquid is more preferably 10 to 30 Pa·s.

<Coating Step>

As described in FIG. 1 as a reference, the method of providing the sheet-like reinforcing fiber bundle 1a with the coating liquid 2 in the coating device 100 is a method in which a plurality of the reinforcing fibers 1 unwound from the creels 11 are arranged unidirectionally (in the depth direction of the page) through the arrangement device 12 to obtain the sheet-like reinforcing fiber bundle 1a, and then, the sheet-like reinforcing fiber bundle 1a is allowed to pass through the coating section 20 in the substantially vertically downward direction Z to provide both faces of the sheet-like reinforcing fiber bundle 1a with the coating liquid 2. Thus, the coating liquid impregnated sheet-like reinforcing fiber bundle 1b can be obtained.

Furthermore, if necessary, at least one side of the coating liquid impregnated sheet-like reinforcing fiber bundle 1b may be provided with the release sheet 3, and the coating liquid impregnated sheet-like reinforcing fiber bundle 1b and the release sheet 3 may be simultaneously wound up using the wind-up device 15. In particular, in cases where part or all of the coating liquid 2 applied to the coating liquid impregnated sheet-like reinforcing fiber bundle 1b is present on the surface of the coating liquid impregnated sheet-like reinforcing fiber bundle 1b and has high fluidity and adhesiveness though the coating liquid 2 has reached the conveyance roll 14, the release sheet 3 can prevent part of the coating liquid 2 on the surface of the coating liquid impregnated sheet-like reinforcing fiber bundle 1b from being transferred to the conveyance roll 14. Furthermore, the method can prevent adhesion between the coating liquid impregnated sheet-like reinforcing fiber bundles 1b and provides easy handling in the post-process. The release sheet is not limited to a particular one as long as the release sheet achieves the above-mentioned effect, and examples thereof include not only a release paper but also an organic polymer film whose surface is coated with a release agent, and the like.

Next, with reference to FIGS. 2 to 4, a step of providing the sheet-like reinforcing fiber bundle 1a with the coating liquid 2 will be described in detail. FIG. 2 is an enlarged detail cross-sectional view of the coating section 20 in FIG. 1. The coating section 20 has wall surface members 21a and 21b that are opposed to each other with a given gap D in between, and between the wall surface members 21a and 21b, a liquid pool 22 whose cross-sectional area decreases continuously in the vertically downward direction Z (that is, in the running direction of the sheet-like reinforcing fiber bundle) and a slit-like narrowed section 23 positioned below the liquid pool 22 (on the discharge side of the sheet-like reinforcing fiber bundle 1a) and having a cross-sectional area smaller than the cross-sectional area of the top side of the liquid pool 22 (the introduction side of the sheet-like reinforcing fiber bundle 1a) are formed. In FIG. 2, the sheet-like reinforcing fiber bundle 1a is arranged in the depth direction of the page.

In the coating section 20, the sheet-like reinforcing fiber bundle 1a introduced into the liquid pool 22 runs in the vertically downward direction Z, and, at the same time, is accompanied by the coating liquid 2 surrounding the fiber bundle. During this, the accompanying coating liquid 2 is gradually compressed, and the pressure of the coating liquid 2 increases toward the lower portion of the liquid pool 22, because the cross-sectional area of the liquid pool 22 decreases in the vertical downward direction Z (in the running direction of the sheet-like reinforcing fiber bundle 1a). When the pressure in the lower portion of the liquid pool 22 increases, it is more difficult for the accompanying liquid flow to flow toward the lower portion any further, and the accompanying liquid flows in the direction of the wall surface members 21a and 21b, and then impeded by the wall surface members 21a and 21b, resulting in flowing upward. As a result, a circular stream T is formed along the plane of the sheet-like reinforcing fiber bundle 1a and the wall surfaces of the wall surface members 21a and 21b in the liquid pool 22. Thus, even if the sheet-like reinforcing fiber 1a brings fuzz in the liquid pool 22, the fuzz moves along the circular stream T, and cannot approach the lower portion of the liquid pool 22, where the liquid pressure is larger, or the narrowed section 23. Further as below-mentioned, bubbles stick to the fuzz, and accordingly, the fuzz moves upward along the circular stream T, and passes near the liquid surface at the top of the liquid pool 22. This also makes it possible not only that the fuzz is prevented from clogging the lower portion of the liquid pool 22 and the narrowed section 23, but also that the retained fuzz is easily collected through the liquid surface at the top of the liquid pool 22. Furthermore, when the sheet-like reinforcing fiber bundle 1a is run at a high speed, the liquid pressure further increases, and accordingly, the fuzz elimination effect becomes higher. As a result, this makes it possible to provide the sheet-like reinforcing fiber bundle 1a with the coating liquid 2 at a higher speed, and enhances productivity significantly.

In addition, the increased liquid pressure has the effect of making it easier for the sheet-like reinforcing fiber bundle 1a to be impregnated with the coating liquid 2. This is based on the property (Darcy's law) according to which the degree at which a porous object such as a reinforcing fiber bundle is impregnated with a coating liquid is increased by the pressure of the coating liquid. This can also enhance the impregnation effect because running the sheet-like reinforcing fiber bundle 1a at a higher speed increases the liquid pressure further. In this regard, the coating liquid 2 is impregnated through gas-liquid replacement with bubbles remaining in the sheet-like reinforcing fiber bundle 1a, and the bubbles are discharged through the split in the sheet-like reinforcing fiber bundle 1a by the liquid pressure and ascending force in the orientation direction (in the vertically upward direction) of the fibers. Here, the bubbles are discharged without pushing away the in-coming coating liquid 2 for impregnation, and accordingly, also has the effect of not inhibiting impregnation. In addition, part of the bubbles are discharged in the out-of-plane direction (in the normal direction) from the surface of the sheet-like reinforcing fiber bundle 1a, and the bubbles are eliminated rapidly by the liquid pressure and ascending force in the vertically upward direction, and accordingly, are not retained in that lower portion of the liquid pool 22 which affords a high impregnation effect, whereby the effect of promoting the discharge of the bubbles efficiently is also achieved. These effects enable the sheet-like reinforcing fiber bundle 1a to be efficiently impregnated with the coating liquid 2, and, as a result, make it possible to obtain a high quality coating liquid impregnated sheet-like reinforcing fiber bundle 1b impregnated uniformly with the coating liquid 2.

Further, the increased liquid pressure allows the sheet-like reinforcing fiber bundle 1a to be automatically aligned with the center of the gap D, and the sheet-like reinforcing fiber bundle 1a is not directly abraded against the wall surfaces of the liquid pool 22 and the narrowed section 23, whereby the effect of suppressing the generation of fuzz here is also achieved. This is because, when any external disturbance or the like causes the sheet-like reinforcing fiber bundle 1a to approach either side in the gap D, the coating liquid 2 is pushed and compressed in the resulting narrower gap on the approached side, and accordingly, the liquid pressure further increases on the approached side, pushing the sheet-like reinforcing fiber bundle 1a back to the center of the gap D.

The narrowed section 23 is designed to have a smaller cross-sectional area than the top side of the liquid pool 22. As understood from FIG. 2 and FIG. 4, the smaller cross-sectional area is simply due to the fact that the length in the direction perpendicular to the pseudo-plane of the sheet-like reinforcing fiber bundle is smaller, that is, the distance between the members is narrower. This is intended to achieve the impregnation and the automatic alignment effect through increasing the liquid pressure in the narrowed section as above-mentioned. In addition, the cross-sectional shape of the uppermost face of the narrowed section 23 is preferably made to conform to the cross-sectional shape of the lowermost face of the liquid pool 22, from the viewpoint of the running properties of the sheet-like reinforcing fiber bundle 1a and the flow control of the coating liquid 2, but, if necessary, the cross-sectional shape of the uppermost face of the narrowed section 23 may be made slightly larger.

In this respect, the sheet-like reinforcing fiber bundle 1a in the coating section 20 in FIG. 2 runs in the completely vertically downward direction Z (at 90 degrees to the horizontal face), but, without limitation to this, may run in the substantially vertically downward direction to the extent that the fuzz collection effect and the bubbles discharge effect can be obtained, and that the sheet-like reinforcing fiber bundle 1a can run stably and continuously.

In addition, the total amount of the coating liquid 2 applied to the sheet-like reinforcing fiber bundle 1a can be controlled in the gap D of the narrowed section 23. For example, in cases where the total amount of the coating liquid 2 applied to the sheet-like reinforcing fiber bundle 1a is desired to be larger (the basis weight is desired to be larger), the wall surface members 21a and 21b may be disposed in such a manner that the gap D is wider.

FIG. 3 is a bottom side view of the coating section 20, as viewed in the direction A in FIG. 2. In the coating section 20, side wall members 24a and 24b are provided to prevent the coating liquid 2 from leaking by both ends of the sheet-like reinforcing fiber bundle 1a in the arrangement direction, and the outlet 25 of the narrowed section 23 is formed in the space surrounded by the wall surface members 21a and 21b and the side wall members 24a and 24b. Here, the outlet 25 is slit-like, and the cross-sectional aspect ratio (Y/D in FIG. 3) may be set in accordance with the shape of the sheet-like reinforcing fiber bundle 1a which is desired to be provided with the coating liquid 2.

FIG. 4a is a cross-sectional view depicting the structure of the inside of the coating section 20, as viewed in the direction B. Here, to make the view easier to see, the wall surface member 21b is omitted, and in addition, the sheet-like reinforcing fiber bundle 1a is depicted as if the reinforcing fibers 1 are arranged with a split between the fibers, but, in reality, it is preferable to arrange the reinforcing fibers 1 with no clearance between the fibers, from the viewpoint of the grade of the sheet-like prepreg and the mechanical property of FRP.

FIG. 4b depicts the flow of the coating liquid 2 in the clearance gap 26. When the clearance gap 26 is large, a circular stream in the edge is generated in the direction of R in the coating liquid 2. This circular stream R in the edge becomes an outward flow (Ra) in the lower portion of the liquid pool 22, and accordingly, results in tearing apart the sheet-like reinforcing fiber bundle (causing split of the sheet-like fiber bundle) or expanding the distance between the reinforcing fibers, and because of this, there is a possibility that arrangement nonuniformity is caused in the reinforcing fibers in the resulting coating liquid impregnated sheet-like reinforcing fiber bundle. In addition, the circular stream R becomes an inward flow (Rb) in the upper portion of the liquid pool 22, and accordingly, the sheet-like reinforcing fiber bundle 1a is compressed in the width direction, resulting in breakage of the edge of the fiber bundle in some cases. In a device, such as typified by Patent Literature 2 (JP 3252278 B2), for coating both faces of an integrated sheet-like base material (particularly, a film) with a coating liquid, such a circular stream as caused in the edge in the clearance clearance gap 26 affects the quality insignificantly, and accordingly, has attracted no attention.

In view of this, width regulation for making the clearance clearance gap 26 smaller is carried out in the present invention, whereby the generation of the circular stream in the edge is preferably suppressed. Specifically, the width L of the liquid pool 22, in other words, the distance L between the side plate members 24a and 24b is preferably adapted to satisfy the following relationship with the width W of the sheet-like reinforcing fiber bundle measured immediately under the narrowed section 23.

$L \leq W+10$ (mm)

This suppresses the generation of a circular stream in the edge and makes it possible to suppress split and edge folding of the sheet-like reinforcing fiber bundle 1a and to obtain the coating liquid impregnated sheet-like reinforcing fiber bundle 1b in which the reinforcing fibers 1 are uniformly arranged over the full width (W) of the coating liquid impregnated sheet-like reinforcing fiber bundle 1b and which is of high grade and has high stability. Furthermore, this technology applied to a prepreg can not only enhance the grade and quality of the prepreg but also enhance the mechanical property and quality of FRP obtained using the prepreg. The relationship between L and W is more preferably $L \leq W+2$ (mm), and thus, the split and edge folding of the sheet-like reinforcing fiber bundle can further be suppressed.

In addition, it is preferable to make adjustments so that the lower limit of L is equal to or greater than W−5 (mm), with a view to enhancing the uniformity of the dimension in the width direction of the coating liquid impregnated sheet-like reinforcing fiber bundle 1b.

In this regard, this width regulation is preferably carried out at least in the lower portion of the liquid pool 22 (the G position in FIG. 4a), with a view to suppressing the generation of the circular stream R in the edge due to a high liquid pressure in the lower portion of the liquid pool 22. Furthermore, this width regulation is more preferably carried out in the whole region of the liquid pool 22, whereby the generation of the circular stream R in the edge can be suppressed substantially completely, and, as a result, the split and edge folding of the sheet-like reinforcing fiber bundle can be suppressed substantially completely.

In addition, the width regulation may be carried out only to the liquid pool 22 if it is carried out only with a view to suppressing the circular stream in the edge in the clearance gap 26, but it is preferable to carry out the width regulation also to the narrowed section 23 in the same way, with a view to suppressing excessive application of the coating liquid 2 to the sides of the coating liquid impregnated sheet-like reinforcing fiber bundle 1b.

<Width Regulation Mechanism>

The above-mentioned has described a case where the side wall members 24a and 24b serve for the purpose of width regulation, but, as shown in FIG. 5, it is also possible to provide width regulation mechanisms 27a and 27b between the side wall members 24a and 24b and to carry out width regulation using such mechanisms. This is preferable because the capability to freely change the width regulated by the width regulation mechanisms makes it possible to use one coating section to produce different coating liquid impregnated sheet-like reinforcing fiber bundles having different widths. Here, the relationship between the width (W) of the sheet-like reinforcing fiber bundle immediately under the narrowed section and the width (L2) regulated by the width regulation mechanisms at the bottom ends of the width regulation mechanisms is preferably $L2 \leq W+10$ (mm), more preferably $L2 \leq W+2$ (mm). In addition, it is preferable to make adjustments so that the lower limit of L2 is equal to or greater than W−5 (mm), with a view to enhancing the uniformity of the dimension in the width direction of the coating liquid impregnated sheet-like reinforcing fiber bundle 1b. The shape and material of the width regulation mechanism are each not limited to a particular one, and a plate-like bush type is easy and convenient, and accordingly, preferable. In addition, allowing the width regulation mechanism to have a width smaller than the distance between the wall surface members 21a and 21b in the upper portion, on the other hands, near the liquid surface (as seen in FIG. 5, the width refers to the vertical length of the width regulation mechanism in the "View seen in the Z direction") is preferable because such a width makes it possible not to impede the horizontal flow of the coating liquid. On the other hand, the shape from the middle portion to the lower portion of the width regulation mechanism is preferably in conformity to the internal shape of the coating section because such conformity can make it possible to suppress the retention of the coating liquid in the liquid pool and suppress the degradation of the coating liquid. In this sense, the width regulation mechanism is preferably inserted into the narrowed section 23. FIG. 5 shows an example of a plate-like bush as the width regulation mechanism, and shows an example in which the portion from the middle portion to the lower portion of the bush is in conformity to the tapered shape of the liquid pool 22 and in which the portion is inserted into the narrowed section 23. FIG. 5 shows an example in which L2 is constant from the liquid surface to the outlet, but the width to be regulated may vary depending on the site to the extent that the purpose of the width regulation mechanism is fulfilled. The width regulation mechanism can be fixed in the coating section 20 by any method, and fixing the mechanism of a plate-like bush type at a plurality of sites in the vertical direction can make it possible to suppress variation of the regulation width due to the deformation of the plate-like bush caused by a high liquid pressure. For example, using a stay for the upper portion and inserting the lower portion into the coating section makes it easy to regulate the width by the width regulation mechanism, and accordingly, is preferable.

<Shape of Liquid Pool>

As described above in detail, it is important in the present invention that allowing the cross-sectional area to decrease continuously in the running direction of the sheet-like reinforcing fiber bundle in the liquid pool 22 increases the liquid pressure in the running direction of sheet-like reinforcing fiber bundle, and here, the shape of the cross-sectional area decreasing continuously in the running direction of the sheet-like reinforcing fiber bundle is not limited to a particular one as long as the shape allows the liquid pressure to increase continuously in the running direction. The shape may be a tapered (linear) one or show a curved form such as a trumpet shape in the cross-sectional view of the liquid pool. In addition, the cross-sectional area decreasing portion may be continuous over the full length of the liquid pool, or the liquid pool may contain a part in which the cross-sectional area does not decrease or contrarily increases, to the extent that the object and effect of the present invention can be achieved. These will be described in detail below with reference to FIGS. 6 to 9.

FIG. 6 is a detail cross-sectional view of the coating section 20b according to an embodiment other than in FIG. 2. The coating section 20b is the same as the coating section 20 in FIG. 2 except that wall surface members 21c and 21d constituting the liquid pool 22 are different in shape. As in the coating section 20b in FIG. 6, the liquid pool 22 may be sectioned into the region 22a in which the cross-sectional area decreases continuously in the vertically downward direction Z and the region 22b in which the cross-sectional area does not decrease. In this case, the vertical height H along which the cross-sectional area decreases continuously is preferably 10 mm or more. The vertical height H along which the cross-sectional area decreases continuously is more preferably 50 mm or more. This assuredly affords a distance along which the coating liquid 2 accompanying the sheet-like reinforcing fiber bundle 1a is compressed in the region 22a in which the cross-sectional area of the liquid pool 22 decreases continuously, whereby the liquid pressure generated in the lower portion of the liquid pool 22 can be increased sufficiently. This consequently makes it possible to obtain the effect of allowing the liquid pressure to prevent fuzz from clogging the narrowed section 23 and the effect of allowing the liquid pressure to induce the impregnation of the sheet-like reinforcing fiber bundle 1a with the coating liquid 2.

In cases where, as in the coating section 20 in FIG. 2 and the coating section 20b in FIG. 6, the region 22a in which the cross-sectional area of the liquid pool 22 decreases continuously is tapered, the smaller the opening angle θ of the taper, the more preferable, and specifically, the angle is preferably an acute angle (90° or less). This makes it possible that the effect of compressing the coating liquid 2 in the region 22a (tapered portion) in which the cross-sectional area of the liquid pool 22 decreases continuously is enhanced, and that a high liquid pressure is made easier to obtain.

FIG. 7 is a detail cross-sectional view of the coating section 20c according to an embodiment other than in FIG. 6. The coating section 20c is the same as the coating section 20b in FIG. 6 except that wall surface members 21e and 21f constituting the liquid pool 22 form a two-tier taper. In this manner, the region 22a in which the cross-sectional area of the liquid pool 22 decreases continuously may be constituted by a multi-tapered portion composed of two or more tiers. In this case, the opening angle θ of the tapered portion nearest the narrowed section 23 is preferably an acute angle, with a view to enhancing the above-mentioned compression effect. Also in this case, the height H of the region 22a along which the cross-sectional area of the liquid pool 22 decreases continuously is preferably 10 mm or more. The vertical height H along which the cross-sectional area decreases continuously is more preferably 50 mm or more. Having a multi-tier tapered portion as the region 22a in which the cross-sectional area of the liquid pool 22 decreases continuously, as in FIG. 7, makes it possible to maintain the volume of the coating liquid 2 that can be stored in the liquid pool 22, and at the same time, to decrease the angle θ of the tapered portion nearest the narrowed section 23. This increases the liquid pressure caused in the lower portion of the liquid pool 22, and can further enhance the fuzz elimination effect and the impregnation effect of the coating liquid 2.

FIG. 8 is a detail cross-sectional view of the coating section 20d according to an embodiment other than in FIG. 6. The coating section 20d is the same as the coating section 20b in FIG. 6 except that wall surface members 21g and 21h constituting the liquid pool 22 form a tier. In this manner, allowing the lowermost portion of the liquid pool 22 to have the region 22a in which the cross-sectional area decreases continuously makes it possible to obtain the effect of increasing the liquid pressure, wherein the effect is an object of the present invention, and accordingly, the other part of the liquid pool 22 may include a region 22c in which the cross-sectional area decreases intermittently. Allowing the liquid pool 22 to have such a shape as in FIG. 8 makes it possible that the shape of the region 22a in which the cross-sectional area decreases continuously is maintained, and at the same time, that the depth B of the liquid pool 22 is enlarged to increase the volume of the coating liquid 2 that can be stored. As a result, even in cases where the coating liquid 2 cannot be supplied into the coating section 20d continuously, the coating liquid 2 can continue to be provided to the sheet-like reinforcing fiber bundle 1a for a long time, whereby the productivity of the coating liquid impregnated sheet-like reinforcing fiber bundle 1b can be enhanced.

FIG. 9 is a detail cross-sectional view of the coating section 20e according to an embodiment other than in FIG. 6. The coating section 20e is the same as the coating section 20b in FIG. 6 except that wall surface members 21i and 21j constituting the liquid pool 22 form a trumpet shape (curved shape). In the coating section 20b in FIG. 6, the region 22a in which the cross-sectional area of the liquid pool 22 decreases continuously is tapered (linear), but, without limitation to this, may be, for example, in trumpet shape (curved shape) as in FIG. 9. However, the lower portion of the liquid pool 22 and the upper portion of the narrowed section 23 are preferably connected smoothly. This is because any step at the boundary between the lower portion of the liquid pool 22 and the upper portion of the narrowed section 23 causes the sheet-like reinforcing fiber bundle 1a to be caught by the step, where fuzz will undesirably be generated. In cases where, in this manner, the region in which the cross-sectional area of the liquid pool 22 decreases continuously is in trumpet shape, the opening angle θ between the virtual tangent lines of the lowermost region 22a in which the cross-sectional area of the liquid pool 22 decreases continuously is preferably an acute angle.

In this regard, the above description illustrates an example in which the cross-sectional area decreases smoothly, but the cross-sectional area of the liquid pool in the present invention does not necessarily need to decrease smoothly, to the extent that the object of the present invention is not impaired.

FIG. 10 is a detail cross-sectional view of the coating section 30 according to an embodiment other than of the present invention. Differently from an embodiment of the present invention, the liquid pool 32 in FIG. 10 does not contain a region in which the cross-sectional area decreases continuously in the vertical downward direction Z, but the liquid pool 32 is configured such that the cross-sectional area decreases discontinuously and suddenly at the boundary 33 with the narrowed section 23. This makes it more likely that the sheet-like reinforcing fiber bundle 1a causes clogging.

In addition, it is also possible to enhance the impregnation effect by allowing the sheet-like reinforcing fiber bundle to be in contact with a plurality of bars in the coating section. FIG. 11 shows an example in which three bars (35a, 35b, and 35c) are used, and here, the larger the number of bars is, and the longer the contact length between the sheet-like reinforcing fiber bundle and the bars is, and the larger the contact angle is, the more the impregnate ratio can be enhanced. In the example of FIG. 11, the impregnation ratio can be 90% or more. In this regard, two or more kinds of such means for enhancing the impregnation effect may be used in combination.

<Running Mechanism>

Known rollers or the like can suitably be used as a running mechanism for conveying a sheet-like reinforcing fiber bundle and the coating liquid impregnated sheet-like reinforcing fiber bundle according to the present invention. In the present invention, the sheet-like reinforcing fiber bundle is conveyed vertically downward, and accordingly, the rollers are preferably disposed above and below the coating section, which is between the rollers.

In addition, it is preferable in the present invention that the running pathway of the sheet-like reinforcing fiber bundle is as linear as possible in order to suppress arrangement disturbance and fuzzing of the reinforcing fibers. In addition, the running pathway of the sheet-like integrated object is preferably as linear as possible because a bend existing in a conveying step of the sheet-like integrated object that is a laminate of a coating liquid impregnated sheet-like reinforcing fiber bundle and a release sheet generates wrinkles due to a perimeter difference between the inner layer and the outer layer in some cases. From this viewpoint, nip rolls are more preferably used in the running pathway of the sheet-like integrated object.

Which of S-shaped arranged rolls and nip rolls should be used can suitably be determined in accordance with the production conditions and the product characteristics.

<High Tension Take-up Device>

In the present invention, it is preferable that a high tension take-up device for withdrawing the coating liquid impregnated sheet-like reinforcing fiber bundle from the coating section is disposed downstream of the coating section in the process. This is because high friction force and shearing stress are generated between the sheet-like reinforcing fiber bundle and the coating liquid in the coating section, and accordingly, it is preferable that high take-up tension is generated downstream in the process, in order to overcome the high friction force and the shearing stress and withdraw the coating liquid impregnated sheet-like reinforcing fiber bundle. As a high tension take-up device, nip rolls, S-shaped arranged rolls, and the like can be used, and in any case thereof, enhancing friction force between the rolls and the coating liquid impregnated sheet-like reinforcing fiber bundle can prevent slip and achieve stable running. To achieve this, it is preferable to arrange a high friction coefficient material on the surface of the roll, increase the nip pressure, or increase the pressing pressure of the coating liquid impregnated sheet-like reinforcing fiber bundle against the S-shaped arranged rolls. The S-shaped arranged rolls make it possible to more easily control friction force on the basis of the roll diameter and the contact length, and accordingly, are more preferable, with a view to preventing slip.

<Release Sheet Supply Device and Winder>

A release sheet supply device and a winder can suitably be used in producing prepreg or FRP using the present invention. As such a device, any known one can be used, and in any case, it is preferable with a view to running the sheet stably that such a device includes a mechanism for making it possible to feed an unwinding or wind-up tension back to the unwinding or wind-up speed.

<After-Impregnation>

In order to make adjustments to a desired degree of impregnation, it is possible to further combine, with the present invention, a means for further enhancing the degree of impregnation using an impregnation device separately after coating. Here, to distinguish this means from the impregnation in the coating section, such additional impregnation carried out after coating is referred to as after-impregnation, and a device for after-impregnation is referred to as an after-impregnation device. A device used as an after-impregnation device is not limited to a particular one, and can suitably be selected from known ones in accordance with the purpose. For example, as described in JP 2011-132389 A and WO 2015/060299, impregnation can be promoted by preheating a laminate of a sheet-like carbon fiber bundle and a resin on a hot plate and sufficiently softening the resin on the sheet-like carbon fiber bundle, followed by using a device for pressing with nip rolls which are also heated. The hot plate temperature and nip roll surface temperature for preheating, the linear pressure of the nip rolls, and the diameter and number of the nip rolls can suitably be selected so as to achieve a desired degree of impregnation. Alternatively, it is also possible to use such "S-wrap rolls" as described in WO 2010/150022, wherein a prepreg sheet runs in S-shape through the S-wrap rolls. In the present invention, "S-wrap rolls" are simply referred to as "S-shaped arranged rolls". FIG. 1 in WO 2010/150022 describes an example in which a prepreg sheet runs in S-shape, but the contact length between the sheet and the roll may be adjusted in U-shape, V-shape, or A-shape as long as impregnation can be carried out. In addition, opposing contact rolls can be added in cases where the impregnation pressure is increased to enhance the degree of impregnation. Furthermore, as described in FIG. 4 in WO 2015/076981, it is also possible to attempt to increase the production speed of prepreg by arranging a conveyor belt opposite to "S-wrap rolls" and thereby enhancing impregnation efficiency. Alternatively, as described in WO 2017/068159, JP2016-203397 A, and the like, it is also possible to enhance impregnation efficiency by subjecting prepreg to ultrasonication to heat the prepreg rapidly before impregnation. Alternatively, as described in JP2017-154330 A, it is also possible to use an impregnation device in which a plurality of "squeeze blades" are vibrated by an ultrasonic generator. Alternatively, as described in JP2013-22868 A, it is also possible to fold a prepreg up and carry out impregnation.

<Simplified After-Impregnation>

The above description shows an example in which a conventional after-impregnation device is applied, but, in some cases, the temperature of the coating liquid impregnated sheet-like reinforcing fiber bundle is still high immediately under the coating section, and in such cases, it is also possible to simplify and make smaller an impregnation device significantly by adding an after-impregnation operation at a stage where time has not yet elapsed very much after the fiber bundle exits from the coating section, thereby omitting or simplifying a heating device such as a hot plate for heating the coating liquid impregnated sheet-like reinforcing fiber bundle again. An impregnation device positioned immediately under the coating section is referred to as a simplified after-impregnation device. As a simplified after-impregnation device, heated nip rolls and heated S-shaped arranged rolls can be used. Compared with a usual impregnation device, they can make it possible not only to decrease the roll diameter, the set pressure, and the contact length between the prepreg and the rolls, thereby making the device smaller, but also to decrease the power consumption, and accordingly, are preferable.

In addition, applying a release sheet to the coating liquid impregnated sheet-like reinforcing fiber bundle before the coating liquid impregnated sheet-like reinforcing fiber bundle enters the simplified after-impregnation device enhances the running properties of the prepreg, and accordingly, is preferable. FIG. 15 shows an example of a production device for a coating liquid impregnated sheet-like reinforcing fiber bundle, wherein a simplified after-impregnation device is incorporated in the production device.

<Coating Liquid Impregnated Sheet-Like Reinforcing Fiber Bundle>

The impregnation ratio of the coating liquid is desirably 10% or more in the coating liquid impregnated sheet-like reinforcing fiber bundle obtained by the production method according to the present invention. For the impregnation ratio of the coating liquid, the inside of a sampled coating liquid impregnated sheet-like reinforcing fiber bundle that has been torn off can be visually checked to see whether the fiber bundle has been impregnated, and the impregnation ratio can be quantitatively evaluated, for example, by a peeling method. Measuring the impregnation ratio of the coating liquid by a peeling method can be carried out in the following manner. That is, a sampled coating liquid impregnated sheet-like reinforcing fiber bundle is sandwiched between adhesive tapes, these are peeled off, and the reinforcing fiber to which the coating liquid has stuck and the reinforcing fiber to which the coating liquid has not stuck are separated. Then, the ratio of the mass of the whole sheet-like reinforcing fiber bundle that has been used to the mass of the reinforcing fiber to which the coating liquid has stuck can be regarded as an impregnate ratio of the coating liquid based on a peeling method.

<Prepreg Width>

A prepreg that is a kind of precursor of FRP is one form of the coating liquid impregnated sheet-like reinforcing fiber bundle obtained in the present invention, and accordingly, a case where the present invention is applied to FRP applications will be described below, wherein the coating liquid impregnated sheet-like reinforcing fiber bundle is referred to as a prepreg.

The width of a prepreg is not limited to a particular one, and the width may be broad, several tens of centimeters to approximately two meters, or may be tape-like, several millimeters to several tens of millimeters. The width can be selected in accordance with the application. In recent years, a device called ATL (Automated Tape Laying) or AFP (Automated Fiber Placement) in which narrow prepregs or prepreg tapes are automatically laminated has widely been used to make a prepreg laminating step more efficient, and the width is also preferably adapted to such a device. ATL often involves use of narrow prepregs having a width of approximately 7.5 cm, approximately 15 cm, and approximately 30 cm, and AFP often involves use of prepreg tapes having a width of approximately 3 mm to approximately 25 mm.

A method of obtaining a prepreg having a desired width is not limited to a particular one, and a method in which a broad prepreg having a width of approximately 1 m to approximately 2 m is slit into narrow prepregs can be used. Alternatively, in order to simplify or omit the slitting step, the width of the coating section used in the present invention can be adjusted so as to be a desired width from the beginning. For example, in cases where a narrow prepreg having a width of 30 cm is produced for ATL, the width of the outlet of the coating section can be adjusted in accordance with the former width. Further in order to produce this prepreg efficiently, it is preferable to produce a product having a width of 30 cm, and juxtaposing a plurality of such production devices enables prepregs to be produced in a plurality of lines using the same running devices, conveyance devices, various rolls, and winders. FIG. 17 shows an example in which five coating sections are linked in parallel. Here, five sheet-like reinforcing fiber bundles 416 may pass through the respective independent five reinforcing fiber preheating devices 420 and coating sections 430 to yield five prepregs 471, or the reinforcing fiber preheating devices 420 may be integrated in parallel, and the coating sections 430 may also be so. In this case, the coating sections 430 have only to include five independent width regulation mechanisms and five independent coating section outlet widths.

In addition, prepreg tapes can be obtained by forming a sheet-like reinforcing fiber bundle from approximately one yarn to three yarns of tape-like reinforcing fiber bundles and allowing the resulting sheet-like reinforcing fiber bundle to pass through the coating section whose width is adjusted to afford a desired tape width. For prepreg tapes, particularly the accuracy of the tape width is often required, with a view to controlling cross-directional overlapping between the tapes. Because of this, it is preferable to control the coating section outlet width more strictly, and in this case, it is preferable that the above-mentioned L, L2, and W satisfy the relationship(s) of $L \leq W+1$ mm and/or $L2 \leq W+1$ mm.

<Slit>

The method of slitting prepreg is not limited to a particular one, and a known slitting device can be used. A prepreg may be slit after the prepreg is once wound up and separately mounted in a slitting device, or, to obtain efficiency, a slitting step may be disposed continuously after a prepreg production step without once winding up the prepreg. In addition, the slitting step may be a step in which a 1 m or more broad prepreg is directly slit into prepregs having a desired width, or once cut and split into approximately 30 cm narrow prepregs and then slit again into prepregs having a desired width.

Here, in cases where the above-mentioned plurality of coating sections for narrow prepregs or prepreg tapes are juxtaposed, the respective independent release sheets may be supplied, or a plurality of prepreg sheets may be laminated on one broad release sheet that has been supplied. The width direction edges of the prepreg thus obtained can be cut off and supplied into an ATL or AFP device. In this case, the major part of the edges to be cut off is from the release sheet, and accordingly, the amount of the coating liquid component (the resin component in the case of CFRP) sticking to the slit cutter blade can be decreased, resulting in being also advantageous in that the cleaning cycle for the slit cutter blade can be extended.

<Variation and Application of the Present Invention>

In the present invention, a plurality of coating sections can be used to attempt to make the production process more efficient and more highly capable.

For example, a plurality of coating sections can be disposed so that a plurality of coating liquid impregnated sheet-like reinforcing fiber bundles can be laminated. FIG. 16 shows an example of an aspect in which coating liquid impregnated sheet-like reinforcing fiber bundles are laminated using two coating sections. Two coating liquid impregnated sheet-like reinforcing fiber bundles 471 withdrawn from a first coating section 431 and a second coating section 432 pass by diverting rolls 445, and laminated with release sheets 446 at lamination rolls 447 below. Positioning the release sheet between the coating liquid impregnated sheet-like reinforcing fiber bundle and the diverting roll can suppress the adhesion of the coating liquid impregnated sheet-like reinforcing fiber bundle to the nip roll and stabilize the running, and accordingly, is preferable. FIG. 16 depicts an example of a device in which the release sheets 446 circuits two diverting rolls 445. In this regard, the diverting roll can be replaced with a diverting guide provided with release treatment, or replaced with the like. In FIG. 16, the high tension take-up device 444 is disposed after the lamination position of the coating liquid impregnated sheet-like reinforcing fiber bundle 471, and obviously, can also be disposed before the lamination position.

Such a lamination type of coating liquid impregnated sheet-like reinforcing fiber bundle makes it possible to attempt to make the prepreg lamination efficient, and is effective, for example, in production of a thick type of FRP. In addition, laying up prepregs of a thin type into a multilayer laminate makes it possible to expect that the FRP toughness and the impact resistance are enhanced, and applying the present production method enables a thin type of multilayer laminated prepreg to be obtained efficiently. Furthermore, laminating different kinds of prepregs easily enables a hetero-bound prepreg having functionality imparted thereto to be obtained easily. In this case, it is possible to change the kind and fineness of the reinforcing fiber, the number of filaments, the mechanical property, the fiber surface property, and the like. In addition, the coating liquid (a resin in the case of prepreg) used can also be a different one. For example, a hetero-bound prepreg in which different prepregs having different thicknesses or different prepregs having different mechanical properties are laminated can be obtained. In addition, a prepreg that can achieve both mechanical properties and tackiness properties can be obtained easily by applying a resin having an excellent mechanical property in the first coating section, applying a resin having excellent tackiness properties in the second coating section, and laminating these. Conversely, a resin having no tackiness properties can also be disposed on the surface. In addition, a prepreg having particles on the surface thereof can be obtained easily by applying a particle-free resin in the first coating section and applying a particle-containing resin in the second coating section.

In another aspect, a plurality of coating sections can be juxtaposed with respect to the running direction of the sheet-like reinforcing fiber bundle, in other words, a plurality of coating sections can be juxtaposed in the width direction of the sheet-like reinforcing fiber bundle, as illustrated in FIG. 17 and described above. This enables narrow or tape-like types of coating liquid impregnated sheet-like reinforcing fiber bundles to be produced efficiently. In addition, using different reinforcing fibers and different coating liquids for different coating sections makes it possible to obtain a coating liquid impregnated sheet-like reinforcing fiber bundle having properties varying in the width direction.

In another aspect, a plurality of coating sections can also be disposed in series in the running direction of the sheet-like reinforcing fiber bundle. FIG. 18 shows an example in which two coating sections are disposed in series. Disposing a high tension take-up device 448 between the first coating section 431 and the second coating section 432 is preferable with a view to stabilizing the running of the sheet-like reinforcing fiber bundle 416, and can be omitted depending on the coating conditions and the take-up conditions downstream in the process. In addition, positioning a release sheet between the coating liquid impregnated sheet-like reinforcing fiber bundle withdrawn from the coating section and the high tension take-up device can suppress the adhesion of the coating liquid impregnated sheet-like reinforcing fiber bundle to the nip roll and stabilize the running, and accordingly, is preferable. FIG. 18 depicts an example of a device in which the high tension take-up device 448 is nip rolls, and the release sheets 446 circuits two rolls.

Such a serial type of disposition enables the kinds of coating liquids to be varied in the thickness direction of the coating liquid impregnated sheet-like reinforcing fiber bundle. In addition, even using the same kind of coating liquid enables the running stability and the high-speed running properties to be enhanced by allowing the coating conditions to vary depending on the coating section. For example, a prepreg that can achieve both mechanical properties and tackiness properties can be obtained easily by applying a resin having excellent mechanical properties in the first coating section, applying a resin having excellent tackiness properties in the second coating section, and laminating these. Conversely, a resin having no tackiness properties can also be disposed on the surface. In addition, a prepreg having particles on the surface thereof can be obtained easily by applying a particle-free resin in the first coating section and applying a particle-containing resin in the second coating section.

As above-mentioned, some aspects in which a plurality of coating sections are disposed have been shown, the number of coating sections is not limited to a particular one, and the aspects can be applied in various manners in accordance with the purpose. Needless to say, these types of dispositions can also be combined. Furthermore, the various sizes, shapes, and coating conditions (temperature and the like) of the coating section can be used in mixture.

As described above, the production method according to the present invention not only enables the production to be efficient and stable but also enables the product to be made high-performance and capable, and has excellent extendability.

<Coating Liquid Supply Mechanism>

In the present invention, the coating liquid is stored in the coating section, but it is preferable to replenish the coating liquid suitably because the coating progresses. The mechanism for supplying the coating section with a coating liquid is not limited to a particular one, and a known device can be used. Supplying the coating section with a coating liquid continuously makes it possible not to disturb the liquid surface at the top of the coating section and to stabilize the running of the sheet-like reinforcing fiber bundle, and accordingly, is preferable. For example, the coating liquid can be supplied by its own weight as a driving force from a vessel storing the coating liquid, or supplied continuously using a pump or the like. As a pump, a gear-pump, tube pump, pressure pump, and the like can suitably be used in accordance with the properties of the coating liquid. In addition, in cases where the coating liquid is solid at room temperature, a melter is preferably provided at the upper portion of the storage vessel. In addition, a continuous extruder and the like can be used. As to the supply amount of coating liquid, a mechanism for enabling the coating liquid to be supplied continuously in accordance with the coating amount is preferably provided so that the liquid level of the coating liquid in the upper portion in the coating section can be as constant as possible. For this, for example, a mechanism in which the liquid level and the coating section weight are monitored and fed back to a supply device is conceivable.

<On-Line Monitoring>

In addition, a mechanism for allowing the coating amount to be monitored on-line is preferably provided in order to monitor the coating amount. The on-line monitoring method is not limited to a particular one, and a known one can be used. For example, as a device for thickness measurement, for example, a β-ray gauge can be used. In this case, the coating amount can be estimated by measuring the thickness of a sheet-like reinforcing fiber bundle and the thickness of a coating liquid impregnated sheet-like reinforcing fiber bundle and analyzing the difference between the thicknesses. The coating amount monitored on-line can immediately be fed back to the coating section, and utilized to adjust the temperature of the coating section and the gap D of the narrowed section 23 (see FIG. 2). Needless to say, the coating amount monitoring can be used as defect monitoring. As to the thickness measurement position, for example, in FIG. 12, the thickness of the sheet-like reinforcing fiber bundle 416 can be measured in the vicinity of the diverting roll 419, and the thickness of the coating liquid impregnated sheet-like reinforcing fiber bundle can be measured between the coating section 430 and the diverting roll 441. In addition, on-line defect monitoring is preferably carried out using infrared, near-infrared, camera (image analysis), and the like.

The coating device according to the present invention has a running mechanism and a coating mechanism, wherein the running mechanism allows a sheet-like reinforcing fiber bundle, which is unidirectionally arranged reinforcing fibers, to run substantially vertically downward, and wherein the coating mechanism is capable of storing the coating liquid in the inside thereof, and further includes a liquid pool and a narrowed section which are in communication with each other, wherein the liquid pool has a portion whose cross-sectional area decreases continuously along the running direction of the sheet-like reinforcing fiber bundle, and wherein the narrowed section has a slit-like cross-section and has a smaller cross-sectional area than the top side of the liquid pool.

Below, the present invention will be described in detail with reference to a specific example in which a prepreg is produced using the coating device, as an example of a prepreg that is an aspect of the coating liquid impregnated sheet-like reinforcing fiber bundle. In this regard, the following description is an example, and the present invention is not construed to be limited to the aspect described below.

FIG. 12 is a schematic diagram of an example of a process/device of producing a prepreg using the present invention. A plurality of reinforcing fiber bobbins 412 are fit onto creels 411, and the reinforcing fibers pass by the diverting guides 413 and withdrawn upward. Here, a braking mechanism provided in the creel enables the reinforcing fiber bundle 414 to be withdrawn at a constant tension. A plurality of the reinforcing fiber bundles 414 that have been withdrawn are orderly arranged by a reinforcing fiber arrangement device 415 to form a sheet-like reinforcing fiber bundle 416. Here, FIG. 12 depicts only three yarns of reinforcing fiber bundles, but in reality, two yarns to hundreds of yarns are possible, and adjustments can be made to afford a desired prepreg width and fiber basis weight. Then, the sheet-like reinforcing fiber bundle passes through a fiber bundle widening device 417 and a smoothing device 418, passes by a diverting roll 419, and is conveyed vertically downward. In FIG. 12, the sheet-like reinforcing fiber bundle 416 is linearly conveyed between the devices from the reinforcing fiber arrangement device 415 to the diverting roll 419. In this regard, the fiber bundle widening device 417 and the smoothing device 418 can be skipped suitably, or omitted depending on the purpose. In addition, the arrangement order of the reinforcing fiber arrangement device 415, the fiber bundle widening device 417, and smoothing device 418 can suitably be changed in accordance with the purpose. The sheet-like reinforcing fiber bundle 416 runs vertically downward from the diverting roll 419, passes through the reinforcing fiber preheating device 420 and the coating section 430, and reaches the diverting roll 441. For the coating section 430, any coating section shape can be adopted to the extent that the object of the present invention can be achieved. Examples include such shapes as in FIGS. 2 and 6 to 9. In addition, a bush can be provided as in FIG. 5, if necessary. In addition, bars can be provided in the coating section as in FIG. 11, if necessary. In FIG. 12, a release sheet 446 unwound from a release sheet (upper) supply device 442 can be laminated onto the coating liquid impregnated sheet-like reinforcing fiber bundle, a prepreg 471 in this case, on the diverting roll 441 to yield a sheet-like integrated object. Furthermore, the release sheet 446 unwound from a release sheet (lower) supply device 443 can be inserted onto the lower side of the sheet-like integrated object. Here, a release paper, a release film, or the like can be used as a release sheet. The resulting object can be withdrawn into a high tension take-up device 444. FIG. 12 depicts nip rolls as the high tension take-up device 444. Then, the sheet-like integrated object passes through an after-impregnation device 450 including hot plates 451 and heated nip rolls 452, is cooled in a cooling device 461, is taken up by a take-up device 462, followed by peeling off the release sheet 446, and then, is wound up in a winder 464, whereby a sheet-like integrated object 472 composed of prepreg and a release sheet can be obtained as a product. The sheet-like integrated object is conveyed basically linearly from the diverting roll 441 to the winder 464, and accordingly, generation of wrinkles can be suppressed. Here, the depiction of a coating liquid supply device and an on-line monitoring device is omitted in FIG. 12.

FIG. 13 is a schematic diagram of another example of a process/device of producing a prepreg using the present invention. FIG. 13 is different from FIG. 12 in that the reinforcing fiber bundle 414 withdrawn from the creels 411 is directly formed into the sheet-like reinforcing fiber bundle 416 in the reinforcing fiber arrangement device 415, and conveyed linearly through the fiber bundle widening device 417 and the smoothing device 418, followed by introducing the sheet-like reinforcing fiber bundle 416 upward. Such a configuration eliminates the necessity to install the devices in the upper places and can simplify the installation of platforms and the like significantly.

FIG. 14 is a schematic diagram of another example of a process/device of producing a prepreg using the present invention. In FIG. 14, the creels 411 are installed upstairs, and the running pathway of the sheet-like reinforcing fiber bundle 416 is further linearized.

FIG. 15 is a schematic diagram of another example of a process/device of producing a prepreg using the present invention. Shown here is an example in which a simplified after-impregnation device is used, instead of a usual after-impregnation device shown in FIG. 12. In FIG. 15, a simplified after-impregnation device 453 is installed immediately under the coating section 430, and accordingly, the coating liquid impregnated sheet-like reinforcing fiber bundle 471 in a high-temperature state is introduced into the simplified after-impregnation device 453, so that the impregnation device can be simplified and made smaller. In FIG. 15, heated nip rolls 454 are depicted as an example, but needless to say, smaller heated S-shaped arranged rolls may be used depending on the purpose. Use of a simplified after-impregnation device also has an advantage in that the whole prepreg production device can be made very compact.

FIG. 19 is a schematic diagram of another example of a process/device of producing a prepreg using the present invention. FIG. 19 depicts an example in which high tension take-up S-shaped arranged rolls 449 as a high tension take-up device and two sets of two heated S-shaped arranged rolls 455 (four rolls in total) of an "S-wrap roll" type as an after-impregnation device are used, but the number of rolls may be larger or smaller in accordance with the purpose. In addition, FIG. 19 depicts contact rolls 456 for enhancing the impregnation effect, but the contact rolls can be omitted depending on the purpose.

FIG. 20 is a schematic diagram of another example of a process/device of producing a prepreg using the present invention. This illustrates an example in which heated S-shaped arranged rolls of an "S-wrap roll" type are used also as a high tension take-up device. This also has an advantage in that the whole prepreg production device can be made very compact.

EXAMPLES

Table 1 tabulates the experimental results obtained by providing the sheet-like reinforcing fiber bundle 1a with the coating liquid 2 in Example 1 according the present invention and in Comparative Example 1 in which the present invention was not used. Between both cases, the following conditions under which they were carried out were common: three yarns (having a width of 20 mm/three yarns) of carbon fiber (TORAYCA T800S (24K), manufactured by Toray Industries, Inc.) were used as the reinforcing fiber 1; and the coating liquid 2 obtained by preparing colorless and transparent UNILUB (manufactured by NOF Corporation) in such a manner that the viscosity was 10 Pa·s at 25° C. was used. In addition, the sheet-like reinforcing fiber bundle 1a was run vertically downward and passed through the liquid pool 22 and the narrowed section 23. The running speed was 20 m/minute, the narrowed section 23 had a width Y of 20 mm, and the gap D of the narrowed section 23 was 0.2 mm (in slit shape, having an aspect ratio of 100). Stainless steel blocks were used as the wall surface members 21 forming the liquid pool 22 and the narrowed section 23, and transparent plates made of acryl were used as the side plate members 24a and 24b. The temperature of the coating section was 25° C. As another performing condition, the shape of the liquid pool 22 (whether the cross-sectional area decreases continuously or not) was different between the Example and the Comparative Example.

To evaluate the running stability (continuous productivity) of a sheet-like carbon fiber bundle in the coating liquid providing section, the sheet-like carbon fiber bundle was run continuously for 60 minutes. One which caused no fuzz clogging nor yarn breaking was rated as "Good", and one which caused fuzz clogging and yarn breaking was rated as "Bad". In addition, the shapes of the obtained sheet-like carbon fiber bundles were checked by visual observation. Furthermore, to evaluate the state in which the obtained sheet-like carbon fiber bundle was provided with the coating liquid, the surface of the sheet-like carbon fiber bundle was checked by visual observation. The surface wet with the coating liquid was rated as "Good", and the surface not wet with the coating liquid was rated as "Bad". Furthermore, to examine the impregnating property of the coating liquid into the sheet-like carbon fiber bundle, a sheet-like carbon fiber bundle was quickly obtained immediately under the coating device, and the impregnating property of the coating liquid was checked by visual observation. The sheet-like carbon fiber bundle within which the fibers were wet with the coating liquid was rated as having "Good" impregnating property, and the sheet-like carbon fiber bundle only at and near the surface of which the fibers were wet with the coating liquid was rated as having "Bad" impregnating property. Below, Examples and Comparative Examples will be described in detail.

Example 1

Using the coating section 20 in FIG. 2 according to an embodiment of the present invention, the sheet-like carbon fiber bundle 1a was provided with UNILUB (a coating liquid 2). The running direction of the sheet-like carbon fiber bundle 1a was the vertically downward direction Z, the liquid pool 22 was tapered (the opening angle of the taper was 30°, and the taper had a height of 100 mm), and the liquid pool 22 had a width L of 40 mm. The continuous running at a running speed of 20 m/minute for 60 minutes caused no fuzz clogging nor yarn breaking, and exhibited no sign of fuzz clogging. Furthermore, when the sheet-like reinforcing fiber bundle 1a passing through the liquid pool 22 was observed from the side plate member 24 (transparent) side, fine bubbles having a diameter of 1 mm or less were being generated continuously from the surface of the sheet-like reinforcing fiber bundle 1a in and near the lower portion of the liquid pool 22. The generated bubbles were eliminated upward in the liquid pool 22 by ascending force, and were not retained in the lower portion of the liquid pool 22. In addition, the obtained sheet-like carbon fiber bundle 1b had a width W of 20 mm and was a sheet-like object provided with UNILUB on both faces thereof and having an aspect ratio of 100 or more. The inside of the sheet-like carbon fiber bundle 1b that was torn off by hand was checked by visual observation and thus found to have been impregnated with UNILUB.

Example 1, in which the liquid pool 22 had a width L of 40 mm, and the obtained sheet-like carbon fiber bundle 1b had a width W of 20 mm, did not satisfy the relationship, L≤W+10 mm. In Example 1, part of the sheet-like carbon fiber bundle 1a exhibited split of the fiber bundle and edge folding of the fiber bundle intermittently in the 60-minute running time, and the ratio of the time during which the sheet-like carbon fiber bundle 1a was run uniformly was approximately 20% (see Table 2).

Comparative Example 1

FIG. 10 is a detail cross-sectional view of the coating section 30 according to an embodiment other than of the present invention. Differently from an embodiment of the present invention, the liquid pool 32 in FIG. 10 does not contain a region in which the cross-sectional area decreases continuously in the vertical downward direction Z, but the liquid pool 32 is configured such that the cross-sectional area decreases intermittently (suddenly) at the boundary 33 with the narrowed section 23. In the case where the sheet-like carbon fiber bundle 1a was provided with UNILUB using this coating section 30 under the same conditions as in Example 1, the sheet-like carbon fiber bundle 1a suffered cleavage within the coating section 30 immediately after the start of running at a running speed of 20 m/minute, and became unable to run. Then, the coating section 30 was dismantled and internally observed, resulting in revealing that the boundary 33 between the liquid pool 32 and the narrowed section 23 was clogged with a large amount of fuzz.

TABLE 1

| | | Example 1 | Comparative Example 1 |
|---|---|---|---|
| Performing Conditions | Running Direction of Fiber Bundle | Vertical (Downward) | Vertical (Downward) |

TABLE 1-continued

|  |  | Example 1 | Comparative Example 1 |
|---|---|---|---|
| Evaluation Items | Continuous Decrease in Cross-section of Liquid Pool | Yes (in Tapered Shape, at Opening Angle of 30°) | No (at Opening Angle of 180°) |
|  | Running Stability (Continuous Productivity) | Good | Bad (Fuzz Clogging immediately after Start of Running) |
|  | Shape of Obtained Reinforcing Fiber Bundle | Sheet-like | — |
|  | Coating Liquid Applicability (by Visual Observation) | Good | — |
|  | Impregnating Property (by Visual Observation) | Good | — |

Next, Table 2 tabulates the results obtained by carrying out Examples 2 and 3, in which the relationship between the width W of the coating liquid impregnated sheet-like reinforcing fiber bundle 1b measured immediately under the narrowed section 23 and the width L measured in the lower portion of the liquid pool 22 (at the G position in FIG. 4) was changed. The conditions under which Examples 2 and 3 were carried out were the same as in Example 1 except that the liquid pool 22 had a smaller width L. To evaluate the uniformity of the sheet-like carbon fiber bundle, the sheet-like carbon fiber bundle was run continuously at a running speed of 20 m/minute for 60 minutes, and a measurement was made of the time during which the sheet-like carbon fiber bundle 1a was run uniformly without having split of the fiber bundle (parts at which the sheet-like carbon fiber bundle was torn in streaks) or edge folding of the fiber bundle (parts at which the carbon fiber bundle was folded over) immediately on the liquid pool 22. The sheet-like carbon fiber bundle that was run uniformly without split of the fiber bundle or edge folding of the fiber bundle during the time the ratio of which was 90% or more of the whole running time was rated as "Excellent", 50% or more and less than 90% "Good", 10% or more and less than 50% "Fair", less than 10% "Poor" (the other Examples and Comparative Examples were evaluated in the same manner). Below, Examples will be described in detail.

Example 2

The sheet-like carbon fiber bundle 1a was provided with UNILUB as in Example 1, but the width L of the liquid pool 22 was changed to 30 mm. Here, the width W of the sheet-like carbon fiber bundle 1b measured immediately under the narrowed section 23 was 20 mm, which satisfied the relationship, L≤W+10 mm. The sheet-like carbon fiber bundle 1a that was run continuously at a running speed of 20 m/minute for 60 minutes exhibited split of the fiber bundle and edge folding of the fiber bundle sometimes, and the ratio of the time during which the sheet-like carbon fiber bundle 1a was run uniformly was approximately 70%.

Example 3

The sheet-like carbon fiber bundle 1a was provided with UNILUB as in Example 1, but the width L of the liquid pool 22 was changed to 20 mm. Here, the width W of the sheet-like carbon fiber bundle 1b measured immediately under the narrowed section 23 was 20 mm, which satisfied the relationship, L≤W+10 mm. The sheet-like carbon fiber bundle 1a that was run continuously at a running speed of 20 m/minute for 60 minutes exhibited almost no split of the fiber bundle nor edge folding of the fiber bundle, and the ratio of the time during which the sheet-like carbon fiber bundle 1a was run uniformly was 90% or more.

TABLE 2

|  |  | Example 1 | Example 2 | Example 3 |
|---|---|---|---|---|
| Performing Conditions | L-W | 20 mm | 10 mm | 0 mm |
| Evaluation Items | Split of Fiber Bundle | Fair | Good | Excellent |
|  | Edge Folding of Fiber Bundle | Fair | Good | Excellent |

Next, using the coating section 20 in FIG. 2 according to an embodiment of the present invention, the sheet-like reinforcing fiber bundle 1a was provided with a molten resin as the coating liquid 2 to produce a sheet-like prepreg 1b for CFRP. Three yarns (having a width of 20 mm/three yarns) of carbon fiber (TORAYCA T800S (24K), manufactured by Toray Industries, Inc.) were used as the reinforcing fiber 1, and a thermosetting epoxy resin composition composed of a mixture of an epoxy resin (a mixture of an aromatic amine type of epoxy resin and a bisphenol type of epoxy resin), a hardener (diaminodiphenyl sulfone), and polyethersulfone was used as the coating liquid 2 (a molten resin). The viscosity of this thermosetting epoxy resin composition was measured using the ARES-G2 manufactured by TA Instruments, Inc. at a measurement frequency of 0.5 Hz at a temperature ramp rate of 1.5° C./minute and was found to be 50 Pa·s at 75° C., 15 Pa·s at 90° C., and 4 Pa·s at 105° C. Stainless steel blocks were used as the wall surface members 21a and 21b forming the liquid pool 22 and the narrowed section 23, and stainless steel plates were used as the side plate members 24a and 24b. Furthermore, to melt the epoxy resin, a ribbon heater was wound around the periphery of the wall surface members 21a and 21b and the side plate members 24a and 24b, and the temperature and viscosity of the epoxy resin were adjusted with a temperature measurement being made using a thermocouple. The running direction of the sheet-like carbon fiber bundle 1a was the vertically downward direction Z, the liquid pool 22 was tapered (the opening angle of the taper was 30°, and the taper had a height of 100 mm), the liquid pool 22 had a width L of 20 mm, the narrowed section 23 had a gap D of 0.2 mm, and the narrowed section 23 had a width Y of 20 mm (an aspect ratio of 100). Below, Examples will be described in detail.

Examples 4 to 6

Table 3 tabulates the results obtained by carrying out the 60-minute continuous running at a running speed of 20 m/minute with the coating liquid temperature set in three manners: at 75° C. (Example 4), 90° C. (Example 5), and 105° C. (Example 6). In no case under any of these conditions, any fuzz clogging or yarn breaking occurred, or any sign of fuzz clogging was exhibited (the running stability was "Good"). In addition, the sheet-like carbon fiber bundle 1a immediately on the liquid pool 22 exhibited almost no split of the fiber bundle nor edge folding of the fiber bundle, and the ratio of the time during which the sheet-like carbon fiber bundle 1a was run uniformly was 90% or more (the split of the fiber bundle was rated as "Excellent", and the edge folding of the fiber bundle was rated as "Excellent"). The obtained sheet-like prepreg 1b was a sheet-like object having a coating liquid sticking on both faces thereof and having an aspect ratio of 100 or more. The obtained sheet-like carbon fiber bundle 1b that was torn off had a coating liquid sticking on some of the carbon fibers within the sheet-like carbon fiber bundle, and thus found to have been impregnated. In addition, to quantitate impregnation, the mass ratio of the mass (only the fiber portion) of the fibers (the impregnated portion) having a coating liquid sticking thereto to the whole mass of the fed sheet-like carbon fiber bundle 1a was defined as an impregnation ratio, and the impregnation ratios in Examples 4 to 6 were 40 to 60%.

TABLE 3

|  |  | Example 4 | Example 5 | Example 6 |
|---|---|---|---|---|
| Performing Conditions | Coating Liquid Temperature/Viscosity | 75° C./ 50 Pa · s | 90° C./ 15 Pa · s | 105° C./ 4 Pa · s |
| Evaluation Items | Running Stability | Good | Good | Good |
|  | Split of Fiber Bundle | Excellent | Excellent | Excellent |
|  | Edge Folding of Fiber Bundle | Excellent | Excellent | Excellent |
|  | Impregnation Ratio (mass %) | 40% | 50% | 60% |

Examples 7 and 8

Next, Table 4 tabulates the results obtained by carrying out the 60-minute continuous running at a running speed of 20 m/minute with the coating liquid temperature set at 90° C. in Examples 7 and 8 in which the height H along which the cross-sectional area of the liquid pool 22 decreases continuously was changed. The conditions under which Examples 7 and 8 were carried out were the same as the conditions under which Example 5 was carried out except that the coating section 20d in FIG. 8 according to the present invention was used as the coating section. Between Examples 7 and 8, the following conditions under which they were carried out were common: the region 22a in which the cross-sectional area of the liquid pool 22 decreases continuously was tapered (linear), the opening angle θ of the taper was 30°, and the height C up to the liquid surface at the top of the liquid pool 22 was 100 mm. The height H along which the cross-sectional area of the liquid pool 22 decreases continuously was 5 mm in Example 7 and 10 mm in Example 8. In no case under any of these conditions, any fuzz clogging or yarn breaking occurred (the running stability was "Good").

Furthermore, to evaluate a sign of fuzz clogging, the coating section 20d was dismantled after each of the 60-minute and the 120-minute continuous running, the liquid contact surface of each of the wall surface members 21g and 21h was checked by visual observation for fuzz. The fuzz prevention properties in 60 minutes and in 120 minutes were evaluated as follows: the fuzz prevention properties by virtue of which fuzz stuck to or to the vicinity of the narrowed section 23 after the continuous running was rated as "Poor"; the fuzz prevention properties by virtue of which fuzz stuck to the portion far from the narrowed section 23 (to the vicinity of the upper portion of the liquid pool 22) after the continuous running was rated as "Fair"; the fuzz prevention properties by virtue of which no fuzz stuck to the liquid contact surface of any of the wall surface members 21g and 21h after the continuous running was rated "Good".

With a comparison made among these including also Example 5, the larger the height H along which the cross-sectional area of the liquid pool 22 decreases, the smaller the approach of fuzz to the vicinity of the narrowed section 23 after the continuous running, and the more enhanced the fuzz prevention properties. In addition, under any of the conditions, the sheet-like carbon fiber bundle 1a immediately on the liquid pool 22 exhibited almost no split of the fiber bundle nor edge folding of the fiber bundle, and the ratio of the time during which the sheet-like carbon fiber bundle 1a was run uniformly was 90% or more (the split of the fiber bundle was rated as "Excellent", and the edge folding of the fiber bundle was rated as "Excellent"). The obtained sheet-like prepreg 1b was a sheet-like object having a coating liquid sticking on both faces thereof and having an aspect ratio of 100 or more. The obtained sheet-like carbon fiber bundle 1b that was torn off by hand had a coating liquid sticking on some of the carbon fibers within the sheet-like carbon fiber bundle, and thus found to have been impregnated. In addition, the impregnation ratio was 45% by mass in Example 7 and 50% by mass in Example 8. With a comparison made among these including also Example 5 (having an impregnation ratio of 50%), the larger the height H along which the cross-sectional area of the liquid pool 22 decreases continuously, the more enhanced the impregnation ratio.

TABLE 4

|  |  | Example 7 | Example 8 | (Example 5) |
|---|---|---|---|---|
| Performing Conditions | Height H along which Cross-section decreases continuously | 5 mm | 10 mm | 100 mm |
| Evaluation Items | Running Stability | Good | Good | Good |
|  | Fuzz Prevention Properties (60 minutes) | Fair | Good | Good |
|  | Fuzz Prevention Properties (120 minutes) | Fair | Fair | Good |
|  | Split of Fiber Bundle | Excellent | Excellent | Excellent |
|  | Edge Folding of Fiber Bundle | Excellent | Excellent | Excellent |
|  | Impregnation Ratio (mass %) | 45% | 50% | 50% |

<Evaluation Carried out Using Prepreg Production Device for 300 mm Width>

The coating section type 20c in the form depicted in FIG. 7 was used as a coating section, and a device configured as described in FIG. 21 (the depiction of a resin supply section is omitted) was used as a prepreg production device.

In the coating section 20c, stainless steel blocks were used as the wall surface members 21e and 21f forming the liquid pool 22 and the narrowed section 23, and stainless steel plates were used as the side plate members 24a and 24b. Furthermore, to heat the coating liquid, a plate heater was attached to the periphery of the wall surface members 21e and 21f and the side plate members 24a and 24b, and the temperature and viscosity of the coating liquid were adjusted with a temperature measurement being made using a thermocouple. In addition, the running direction of the sheet-like carbon fiber bundle 416 was the vertically downward direction, the liquid pool 22 was tapered in two tiers, the opening angle of the upper taper was 17°, and the taper had a height (i.e., H) of 100 mm, and the opening angle of the lower taper was 7°. In addition, a plate-like bush 27 conformed to the internal shape of the coating section was provided as a width regulation mechanism, as described in FIG. 5, and furthermore, the installation position of the plate-like bush was made freely variable so that L2 could suitably be adjusted. The width Y of the narrowed section 23 was adapted to become 300 mm when L2 was 300 mm. The gap D of the narrowed section 23 was 0.2 mm. In this case, the aspect ratio of the outlet slit was 1500. In addition, the space external to each bush was closed off at the bottom outlet of the narrowed section so that the coating liquid could not leak through the outlet of the narrowed section.

A sheet-like prepreg for CFRP was produced with the above-mentioned device, using carbon fiber (TORAYCA T800S (24K), manufactured by Toray Industries, Inc.) as a reinforcing fiber and the below-mentioned thermosetting epoxy resin composition as a coating liquid. In addition, the number of reinforcing fiber bobbins 412 was changed in accordance with the prepreg to be produced, and was 56 unless otherwise specified.

The reinforcing fiber bundles 414 withdrawn from a plurality of reinforcing fiber bobbins 412 fit onto the creels 411 were formed into the sheet-like reinforcing fiber bundle 416 in the reinforcing fiber arrangement device 415, and the resulting sheet-like reinforcing fiber bundle was once introduced upward by the diverting rolls 419. Then, the sheet-like reinforcing fiber bundle 416 was passed by the diverting roll 419, conveyed vertically downward, heated in the reinforcing fiber preheating device 420 to the temperature equal to or greater than the temperature of the coating section, introduced into the coating section 430, and coated with the coating liquid. Then, the coating liquid impregnated sheet-like reinforcing fiber bundle (prepreg) 471 was withdrawn from the coating section 430, laminated with the release sheet 446 (a release paper in this case) on the diverting roll 441, and taken up by the high tension take-up S-shaped arranged rolls 449. Then, the lower release sheet 446 (release paper in this case) was supplied to the upper roll of the high tension take-up S-shaped arranged rolls 449 to form a sheet-like integrated object which was a prepreg sandwiched between release paper sheets. Furthermore, this was introduced into the after-impregnation device 450 including the hot plates 451 and the heated nip rolls 452, and was optionally subjected to after-impregnation. Then, the resulting object was passed through the cooling device 461, the upper release paper was peeled off, and the sheet-like integrated object 472 was wound up.

Coating Liquid (Thermosetting Epoxy Resin Composition):

Thermosetting Epoxy Resin Composition 1 (Coating Liquid A):

a mixture of an epoxy resin (a mixture of an aromatic amine type of epoxy resin and a bisphenol type of epoxy resin), a hardener (diaminodiphenyl sulfone), and polyethersulfone; containing no polymer particles. The viscosity of this thermosetting epoxy resin 1 was measured using the ARES-G2 manufactured by TA Instruments, Inc. at a measurement frequency of 0.5 Hz at a temperature ramp rate of 1.5° C./minute and was found to be 50 Pa·s at 75° C., 15 Pa·s at 90° C., and 4 Pa·s at 105° C.

Thermosetting Epoxy Resin Composition 2 (Coating Liquid B):

To a mixture of an epoxy resin (a mixture of an aromatic amine type of epoxy resin and a bisphenol type of epoxy resin), a hardener (diaminodiphenyl sulfone), and polyethersulfone, "particle 3" (having a Tg of 150° C.) described in EXAMPLES in JP2011-162619 A was added as polymer particles so as to account for 12 mass % of the whole mass of the resin composition as 100 mass %, and the resulting mixture was used.

The viscosity of this thermosetting epoxy resin 2 was measured using the ARES-G2 manufactured by TA Instruments, Inc. at a measurement frequency of 0.5 Hz at a temperature ramp rate of 1.5° C./minute and was found to be 118 Pa·s at 75° C., 32 Pa·s at 90° C., and 10 Pa·s at 105° C.

Examples 9 to 10

A 300 mm wide prepreg and a 150 mm wide prepreg were produced using a thermosetting epoxy resin composition 1 (a coating liquid A) as a coating liquid, using two plate-like bushes as a width regulation mechanism, using the respective distances L2 set to 300 mm (Example 9) and 150 mm (Example 10) between the bottom ends of the bushes, and using 56 and 28 carbon fiber bobbins respectively. However, in these Examples 9 and 10, the hot plates 451 and the heated nip rolls 454 in the after-impregnation device 450 were not used, and after-impregnation was not carried out. In this regard, the coating liquid temperature in the liquid pool was 90° C. (corresponding to 15 Pa·s). In addition, the running speeds of the sheet-like reinforcing fiber bundle and the prepreg were 20 m/minute. The various stable running evaluation items and impregnation ratios for this are shown in Table 5. Use of the width regulation mechanism enabled the fiber bundle and prepreg to run stably at a desired prepreg width even when the same coating section was used. The sheet-like reinforcing fiber bundle was found to have "Excellent" split and edge folding of the fiber bundle. In this regard, the evaluation in Table 5 was carried out on the basis of a running time of 30 minutes. Here, the impregnation ratio in the present Example was higher than in Examples 5, 7, and 8, and this is considered to be because the coating section described in FIG. 7 can have a higher liquid pressure.

In addition, the uniformity of the basis weight of the prepreg in the width direction was evaluated as below-mentioned. The 300 mm wide prepreg obtained in Example 9 was cut into a right edge, a center portion, and a left edge in the width direction, 100 mm square each, and the mass of the prepreg and the mass of the carbon fiber were each measured with n=3. The mass of the carbon fiber was measured as a residue obtained by eluting the resin from the prepreg with a solvent. From these, the average values for each sampling position were calculated, the average values for each sampling position were compared, and both the carbon fiber and the resin were found to fall within the range of ±2 mass % and exhibit excellent basis weight uniformity.

TABLE 5

|  |  | Example 9 | Example 10 |
|---|---|---|---|
| Performing Conditions | L2 | 300 mm | 150 mm |
|  | W | 300 mm | 150 mm |
|  | Number of Reinforcing fiber Bobbins | 56 | 28 |
| Evaluation Items | Running Stability | Good | Good |
|  | Fuzz Prevention Properties | Good | Good |
|  | Split of Fiber Bundle | Excellent | Excellent |
|  | Edge Folding of Fiber Bundle | Excellent | Excellent |
|  | Impregnation Ratio (mass %) | 68% | 70% |

Example 11

A 300 mm wide prepreg was produced in the same manner as in Example 9 except that the coating liquid temperature in the liquid pool was changed to 82° C. (corresponding to 28 Pa·s). The various stable running evaluation items and impregnation ratios related to this Example are shown in Table 6. The running was good. However, the "split of the fiber bundle" of the sheet-like reinforcing fiber bundle was not as good as in Example 9, though it was not problematic.

Examples 12 and 13

A 300 mm wide prepreg was produced in the same manner as in Example 9 except that the thermosetting epoxy resin 2 (the coating liquid B) was used as a coating liquid and that the coating liquid temperature in the liquid pool was changed to 90° C. (Example 12) and 105° C. (Example 13). The various stable running evaluation items and impregnation ratios related to these Examples are shown in Table 6. The evaluation results were good for both, but Example 13 had better running stability and impregnation ratio.

In addition, the resin left between the width regulation devices in the coating section after the experiment in Example 13 was sampled and dissolved in a solvent, and the resulting solution was filtrated to collect polymer particles, the mass of which was measured. Using this result, the coating section pass ratio of the polymer particles was calculated at 99% or more, and judging from this, the major part of the polymer particles was found to have passed the coating section and been applied to the prepreg.

Examples 14 and 15

In the same manner as described in Example 9 (corresponding to Example 14) and Example 13 (corresponding to Example 15), the sheet-like reinforcing fiber bundle was impregnated with the coating liquid, subsequently introduced into the after-impregnation device 450, and subjected to inline after-impregnation with reference to JP2011-132389 A, except that the after-impregnation device 450 including the hot plates 451 and the heated nip rolls 452 was started up and used. In both Examples, the degree of impregnation of the obtained prepreg was 90% or more.

Examples 16 and 17

The sheet-like integrated objects composed of 300 mm wide prepreg/release paper sheets obtained in Example 14 and Example 15 were slit to obtain 7 mm wide prepreg tapes. These prepreg tapes were impregnated sufficiently, and accordingly the resin sticking to the cutter blade of the slitter was a little.

Examples 18 to 21, and Reference Example 1

The prepregs and prepreg tapes obtained in Examples 14 to 17 were laminated in six layers, and cured using an autoclave at 180° C. at 6 kgf/cm$^2$ (0.588 MPa) for two hours to obtain CFRPs (Examples 18 to 21). All the obtained CFRPs had a tensile strength in the range from 2.8 GPa to 3.1 GPa, and had suitable mechanical properties as a structural material for the aerospace.

In addition, a prepreg was produced by a conventional hot-melt process using the carbon fiber and the thermosetting epoxy resin 1 (the coating liquid A) that were used in Example 1, and the resulting prepreg was cured using an autoclave at 180° C. at 6 kgf/cm$^2$ (0.588 MPa) for two hours to yield a CFRP, which was found to have a tensile strength of 2.9 GPa (Reference Example 1).

In this regard, the tensile strength of the CFRP was measured in the same manner as in WO 2011/118106, and the value resulting from normalizing the volume % of the reinforcing fibers in the prepreg to 56.5% was used.

INDUSTRIAL APPLICABILITY

The coating liquid impregnated sheet-like reinforcing fiber bundle obtained by the production method according to the present invention can widely be applied as FRP typified

TABLE 6

|  |  | Example 11 | Example 12 | Example 13 |
|---|---|---|---|---|
| Performing Conditions | Coating Liquid | Coating Liquid A | Coating Liquid B | Coating Liquid B |
|  | Temperature in Liquid Pool | 82° C. | 90° C. | 105° C. |
|  | Viscosity of Coating Liquid | 28 Pa·s | 32 Pa·s | 10 Pa·s |
| Evaluation Items | Running Stability | Good | Good | Good |
|  | Fuzz Prevention Properties | Good | Fair | Good |
|  | Split of Fiber Bundle | Good | Good | Excellent |
|  | Edge Folding of Fiber Bundle | Excellent | Excellent | Excellent |
|  | Impregnation Ratio (mass %) | 60% | 55% | 70% |

Coating Liquid A: Thermosetting Epoxy Resin Composition 1
Coating Liquid B: Thermosetting Epoxy Resin Composition 2 by CFRP, in aerospace applications, applications for structural materials and interior materials such as for automobiles, trains, and ships, pressure vessels, industrial material applications, sports material applications, medical equipment applications, housing applications, civil engineering and construction applications, and the like.

The present application is based on Japanese Patent Application No. 2017-056926 filed on 23 Mar. 2017, the content of which is incorporated herein by reference.

REFERENCE SIGNS LIST

1 Reinforcing fiber
1a Sheet-like Reinforcing Fiber Bundle
1b Coating Liquid Impregnated Sheet-like Reinforcing Fiber Bundle
2 Coating Liquid
3 Release Sheet
11 Creel
12 Arrangement Device
13, 14 Conveyance Roll
15 Wind-up Device
16 Release Sheet Supply Device
20 Coating Section
20b Coating Section in another embodiment
20c Coating Section in another embodiment
20d Coating Section in another embodiment
20e Coating Section in another embodiment
21a, 21b Wall Surface Members
21c, 21d Wall Surface Members having another shape
21e, 21f Wall Surface Members having another shape
21g, 21h Wall Surface Members having another shape
21i, 21j Wall Surface Members having another shape
22 Liquid Pool
22a Region whose cross-sectional area decreases continuously in Liquid Pool
22b Region whose cross-sectional area does not decrease in Liquid Pool
22c Region whose cross-sectional area decreases intermittently in Liquid Pool
23 Narrowed Section
24a, 24b Side Plate Members
25 Outlet
26 Clearance Gap
30 Coating Section in Comparative Example 1
31a, 31b Wall Surface Members in Comparative Example 1
32 Liquid Pool in Comparative Example 1
33 Region whose cross-sectional area decreases intermittently in Liquid Pool in Comparative Example 1
35a, 35b, 35c Bars
100 Coating Device
B Depth of Liquid Pool 22
C Height up to the liquid surface at the top of Liquid Pool 22
D Gap of Narrowed Section
G Position at which width regulation is carried out
H Vertical Height along which the cross-sectional area of Liquid Pool 22 decreases continuously
L Width of Liquid Pool 22
R, Ra, Rb Circular Stream in the Edge
T Circular Streams
W Width of Coating Liquid Impregnated Sheet-like Reinforcing Fiber Bundle 1b, as measured immediately under Narrowed Section 23
Y Width of Narrowed Section 23
Z Running Direction (Vertically Downward Direction) of Sheet-like Reinforcing Fiber Bundle 1a
θ Opening Angle of Tapered Portion
411 Creel
412 Reinforcing fiber Bobbin
413 Diverting Guide
414 Reinforcing Fiber Bundle
415 Reinforcing fiber Arrangement Device
416 Sheet-like Reinforcing Fiber Bundle
417 Fiber Bundle Widening Device
418 Smoothing Device
419 Diverting Roll
420 Reinforcing fiber Preheating Device
430 Coating Section
431 First Coating Section
432 Second Coating Section
441 Diverting Roll
442 Release Sheet (Upper) Supply Device
443 Release Sheet (Lower) Supply Device
444 High Tension Take-up Device
445 Diverting Roll
446 Release Sheet
447 Lamination Roll
448 High Tension Take-up Device
449 High Tension Take-up S-shaped Arranged Roll
450 After-impregnation Device
451 Hot Plate
452 Heated Nip Roll
453 Simplified After-impregnation Device
454 Heated Nip Roll
455 Heated S-shaped Arranged Rolls
456 Contact Roll
461 Cooling Device
462 Take-up Device
463 Release Sheet (Upper) Wind-up Device
464 Winder
471 Prepreg (Coating Liquid Impregnated Sheet-like Reinforcing Fiber Bundle)
472 Prepreg/Release Sheet (Sheet-like Integrated Object)

The invention claimed is:

1. A method of producing a coating liquid impregnated sheet-like reinforcing fiber bundle, comprising allowing a sheet-like reinforcing fiber bundle, which is unidirectionally arranged reinforcing fibers, to pass substantially vertically downward through the inside of a coating section storing a coating liquid, whereby the method provides said sheet-like reinforcing fiber bundle with said coating liquid;
wherein said coating section includes a liquid pool and a narrowed section which are in communication with each other;
wherein said liquid pool has a portion whose cross-sectional area decreases continuously along a running direction of said sheet-like reinforcing fiber bundle, and
wherein said narrowed section has a slit-like cross-section and has a smaller cross-sectional area than the top side of said liquid pool.

2. The method of producing a coating liquid impregnated sheet-like reinforcing fiber bundle according to claim 1, wherein the width L of the lower portion of said liquid pool in the arrangement direction of the reinforcing fibers and the width W of said sheet-like reinforcing fiber bundle immediately under said narrowed section satisfy L≤W+10 (mm).

3. The method of producing a coating liquid impregnated sheet-like reinforcing fiber bundle according to claim 1 or 2, wherein said coating section comprises, in said liquid pool, a width regulation mechanism for regulating the width of said sheet-like reinforcing fiber bundle, wherein the relationship between the width (W) of said sheet-like reinforcing fiber bundle immediately under said narrowed section and the width (L2) regulated by said width regulation mechanism at the lower end of said width regulation mechanism satisfies L2≤W+10 (mm).

4. The method of producing a coating liquid impregnated sheet-like reinforcing fiber bundle according to claim 3, wherein said width regulation mechanism is provided over the whole region of said liquid pool and said narrowed section.

5. The method of producing a coating liquid impregnated sheet-like reinforcing fiber bundle according to claim 1, wherein the vertical height of the portion whose cross-sectional area decreases continuously in said liquid pool is 10 mm or more.

6. The method of producing a coating liquid impregnated sheet-like reinforcing fiber bundle according to claim 1, wherein the viscosity of said coating liquid is 1 to 60 Pas as measured at a strain rate of $3.14\ s^{-1}$.

7. The method of producing a coating liquid impregnated sheet-like reinforcing fiber bundle according to claim 1, wherein said coating liquid contains a thermosetting resin.

8. The method of producing a coating liquid impregnated sheet-like reinforcing fiber bundle according to claim 1, comprising: using a coating liquid containing polymer particles; and providing said sheet-like reinforcing fiber bundle with said coating liquid, wherein the temperature of said coating liquid in said coating section is 20° C. or more lower than the glass transition temperature (Tg) or melting temperature (Tm) of a resin constituting said polymer particles.

9. The method of producing a coating liquid impregnated sheet-like reinforcing fiber bundle according to claim 1, wherein said sheet-like reinforcing fiber bundle is heated and then introduced into said liquid pool.

10. The method of producing a coating liquid impregnated sheet-like reinforcing fiber bundle according to claim 1, wherein said sheet-like reinforcing fiber bundle is smoothed and then introduced into said liquid pool.

11. The method of producing a coating liquid impregnated sheet-like reinforcing fiber bundle according to claim 1, wherein said sheet-like reinforcing fiber bundle is widened and then introduced into said liquid pool.

12. A method of producing a sheet-like integrated object, comprising:
obtaining a coating liquid impregnated sheet-like reinforcing fiber bundle by said method of producing a coating liquid impregnated sheet-like reinforcing fiber bundle according to claim 1;
providing at least one side of the obtained coating liquid impregnated sheet-like reinforcing fiber bundle with a release sheet to form a sheet-like integrated object; and
taking up said sheet-like integrated object.

13. The method of producing a sheet-like integrated object according to claim 12, wherein said sheet-like integrated object is formed and then subjected to after-impregnation.

14. A coating device for providing a sheet-like reinforcing fiber bundle, which is unidirectionally arranged reinforcing fibers, with a coating liquid, said coating device comprising:
a running mechanism which allows said sheet-like reinforcing fiber bundle to run substantially vertically downward; and
a coating mechanism,
wherein said coating mechanism is capable of storing said coating liquid in the inside thereof, and further includes a liquid pool and a narrowed section which are in communication with each other;
wherein said liquid pool has a portion whose cross-sectional area decreases continuously along the running direction of said sheet-like reinforcing fiber bundle, and
wherein said narrowed section has a slit-like cross-section and has a smaller cross-sectional area than the top side of said liquid pool.

15. A device for producing a sheet-like integrated object comprising:
a mechanism for arranging reinforcing fibers to form a sheet-like reinforcing fiber bundle;
a mechanism for heating said sheet-like reinforcing fiber bundle;
said coating device according to claim 14;
a device for supplying a release sheet;
a nip roll and/or an S-shaped arranged roll; and
a winder.

16. A prepreg produced using the production method according to claim 1.

17. A prepreg tape obtained by slitting said prepreg according to claim 16.

18. A fiber reinforced composite material obtained by molding said prepreg according to claim 16.

19. A fiber reinforced composite material obtained by molding said prepreg tape according to claim 17.

20. A prepreg produced using the coating device according to claim 14.

21. A prepreg tape obtained by slitting said prepreg according to claim 20.

22. A fiber reinforced composite material obtained by molding said prepreg according to claim 20.

23. A fiber reinforced composite material obtained by molding said prepreg tape according to claim 21.

24. A prepreg produced using the device according to claim 15.

25. A prepreg tape obtained by slitting said prepreg according to claim 24.

26. A fiber reinforced composite material obtained by molding said prepreg according to claim 24.

27. A fiber reinforced composite material obtained by molding said prepreg tape according to claim 25.

* * * * *

UNITED STATES PATENT AND TRADEMARK OFFICE
CERTIFICATE OF CORRECTION

PATENT NO. : 11,224,993 B2
APPLICATION NO. : 16/494912
DATED : January 18, 2022
INVENTOR(S) : Takashi Ochi et al.

It is certified that error appears in the above-identified patent and that said Letters Patent is hereby corrected as shown below:

In the Claims

Claim 6 at Column 39, Line 19, -- Pas -- should read -- Pa·s --

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*